US009535462B2

(12) United States Patent
Watabe et al.

(10) Patent No.: US 9,535,462 B2
(45) Date of Patent: Jan. 3, 2017

(54) INFORMATION PROCESSING DEVICE AND METHOD OF MANUFACTURING INFORMATION PROCESSING DEVICE

(71) Applicant: SONY CORPORATION, Tokyo (JP)

(72) Inventors: Manabu Watabe, Nagano (JP);
Hidenobu Maruyama, Nagano (JP);
Takahiro Totuka, Nagano (JP);
Yasunori Kimura, Nagano (JP);
Takanori Takei, Nagano (JP);
Tomoyuki Tsukamoto, Nagano (JP);
Kiyokuni Arima, Nagano (JP); Shingo Harada, Nagano (JP)

(73) Assignee: Sony Corporation, Tokyo (JP)

( * ) Notice: Subject to any disclaimer, the term of this patent is extended or adjusted under 35 U.S.C. 154(b) by 77 days.

(21) Appl. No.: 14/577,074

(22) Filed: Dec. 19, 2014

(65) Prior Publication Data

US 2015/0185784 A1    Jul. 2, 2015

(30) Foreign Application Priority Data

Dec. 27, 2013 (JP) ................................. 2013-271482
Dec. 27, 2013 (JP) ................................. 2013-273223
Dec. 27, 2013 (JP) ................................. 2013-273224

(51) Int. Cl.
    *G06F 1/16*    (2006.01)
(52) U.S. Cl.
    CPC ........ *G06F 1/1656* (2013.01); *Y10T 29/49002* (2015.01)

(58) Field of Classification Search
    CPC .... G06F 1/1633; G06F 1/1656; G06F 1/1658; G06F 1/1662
    See application file for complete search history.

(56) References Cited

U.S. PATENT DOCUMENTS

| 6,459,591 | B2 * | 10/2002 | Liu ....................... | G06F 1/1656 |
| | | | | 361/679.33 |
| 7,869,205 | B2 * | 1/2011 | Chin .................... | G06F 1/1616 |
| | | | | 361/679.26 |
| 8,089,758 | B2 * | 1/2012 | Zhu ...................... | G06F 1/1618 |
| | | | | 312/223.1 |
| 8,861,191 | B1 * | 10/2014 | Yu ........................ | G06F 1/1601 |
| | | | | 361/679.06 |
| 2006/0164800 | A1 * | 7/2006 | McEwan ............... | G06F 1/1632 |
| | | | | 361/679.26 |
| 2014/0043744 | A1 * | 2/2014 | Matsuoka ............. | G06F 1/1658 |
| | | | | 361/679.09 |
| 2014/0210325 | A1 * | 7/2014 | Aurongzeb .......... | H05K 5/0213 |
| | | | | 312/236 |
| 2016/0116947 | A1 * | 4/2016 | Matsuoka ............. | G06F 1/1679 |
| | | | | 361/679.55 |

* cited by examiner

*Primary Examiner* — Anthony Q Edwards
(74) *Attorney, Agent, or Firm* — Paratus Law Group, PLLC

(57) ABSTRACT

There is provided an information processing device including a casing in which a top surface, a bottom surface, and side surfaces are integrally formed, and an opening portion which is formed in one of the top surface, the bottom surface, and the side surfaces and through which each component to be mounted inside the casing is inserted.

12 Claims, 37 Drawing Sheets

FIG. 5
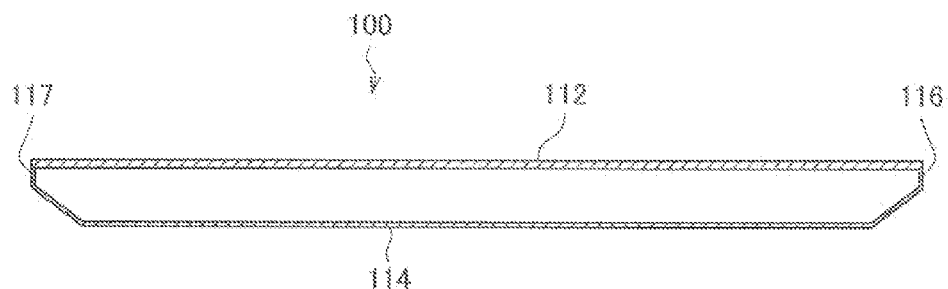
SECTIONAL VIEW TAKEN ALONG A-A
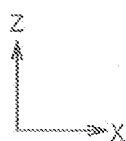
FIG. 6
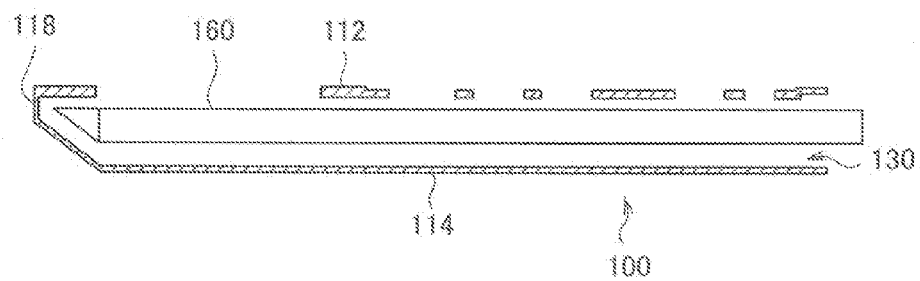
SECTIONAL VIEW TAKEN ALONG B-B
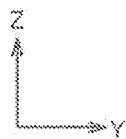

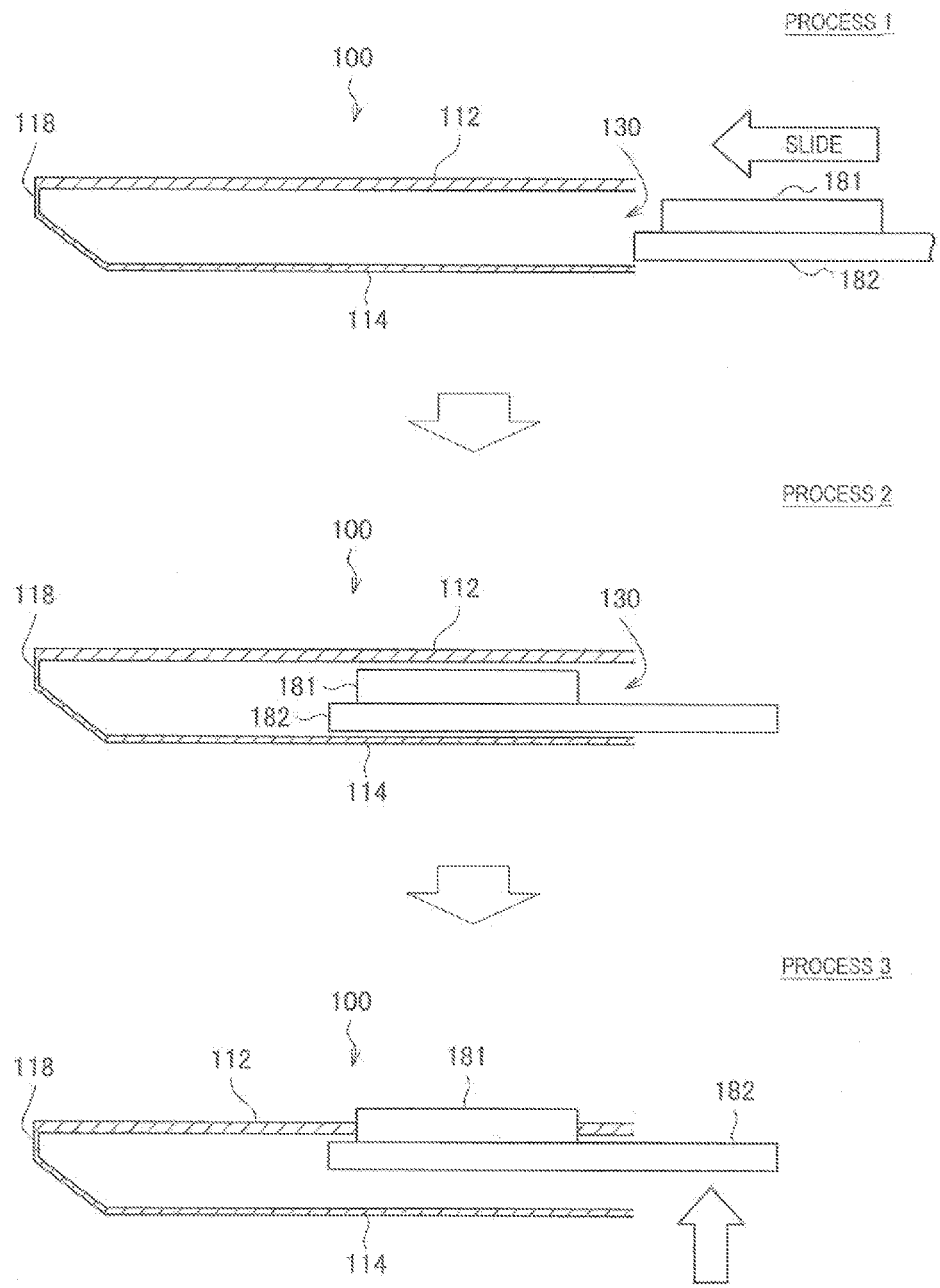

FIG. 8B
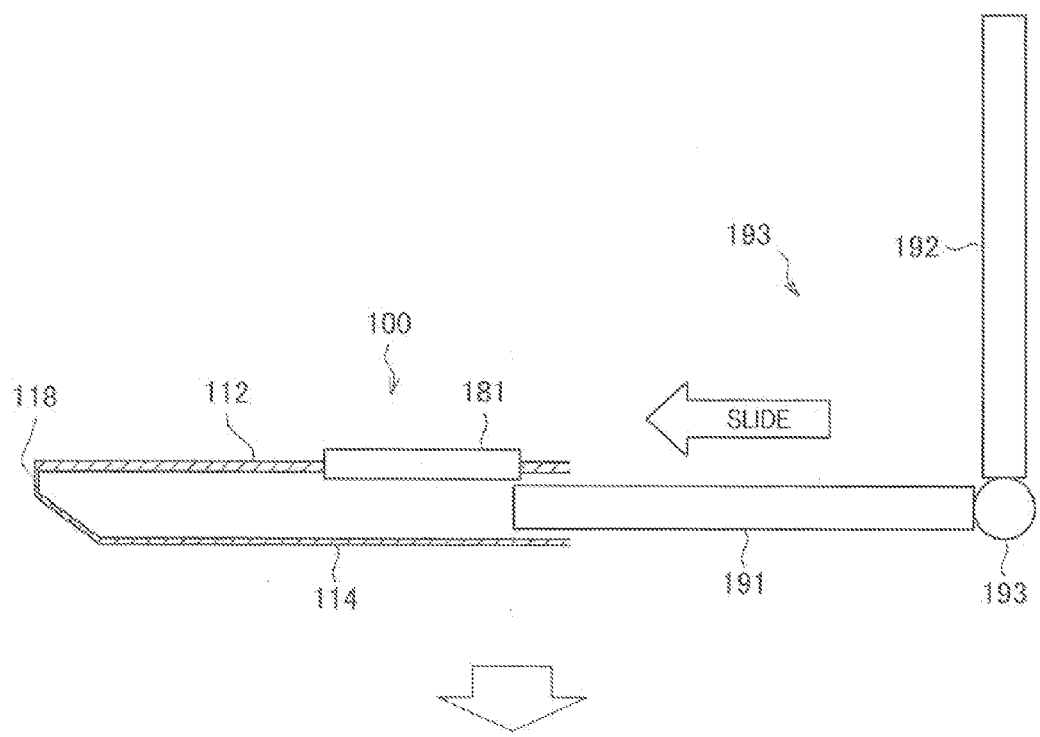
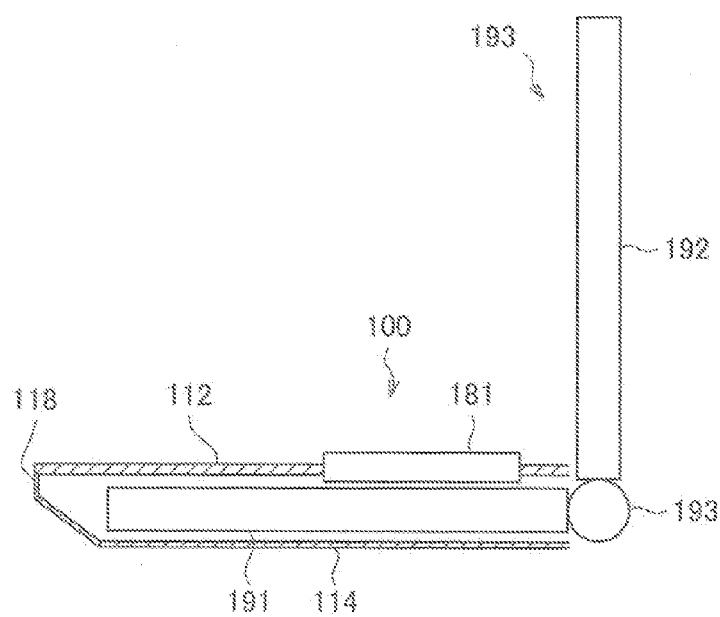

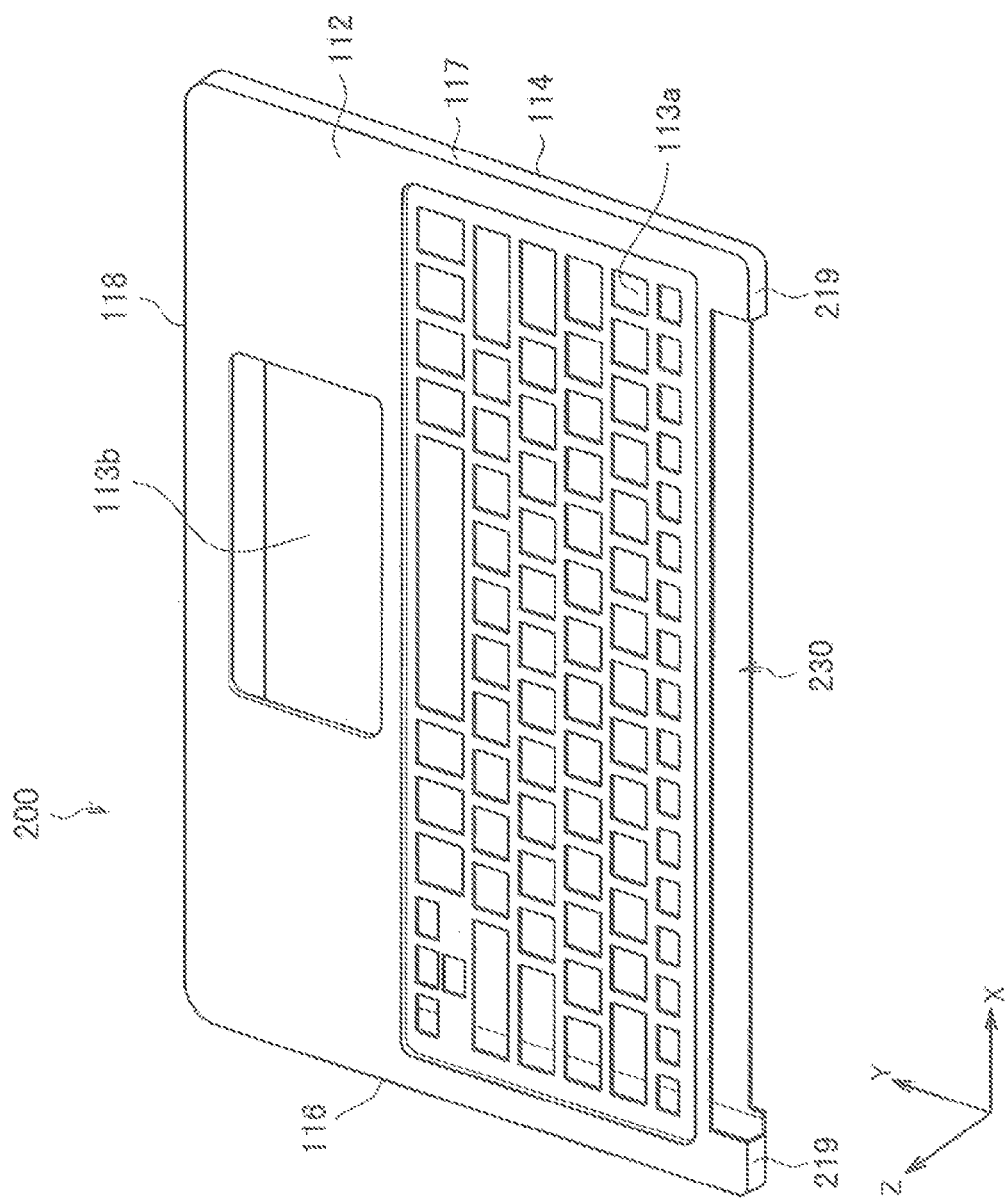

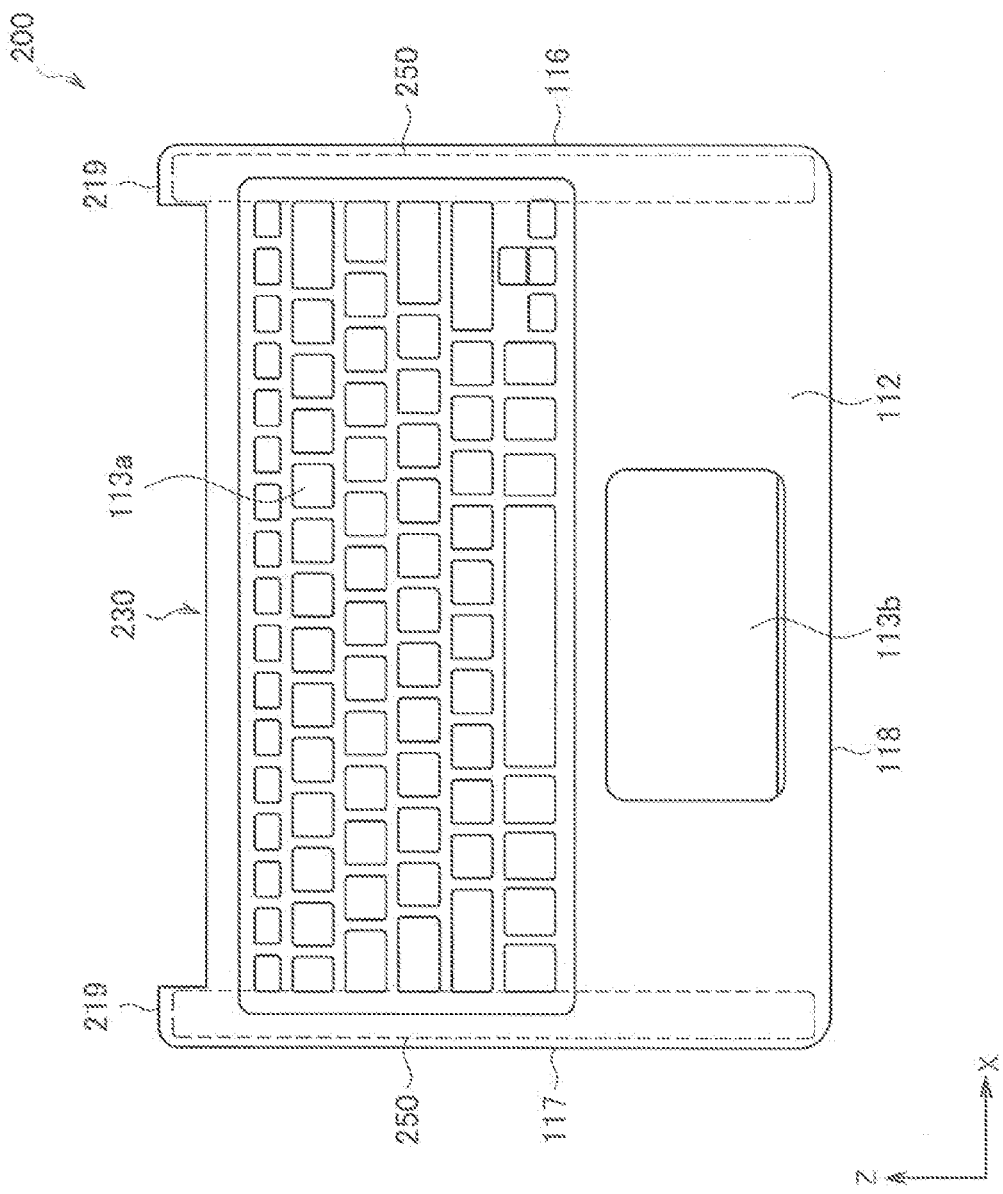

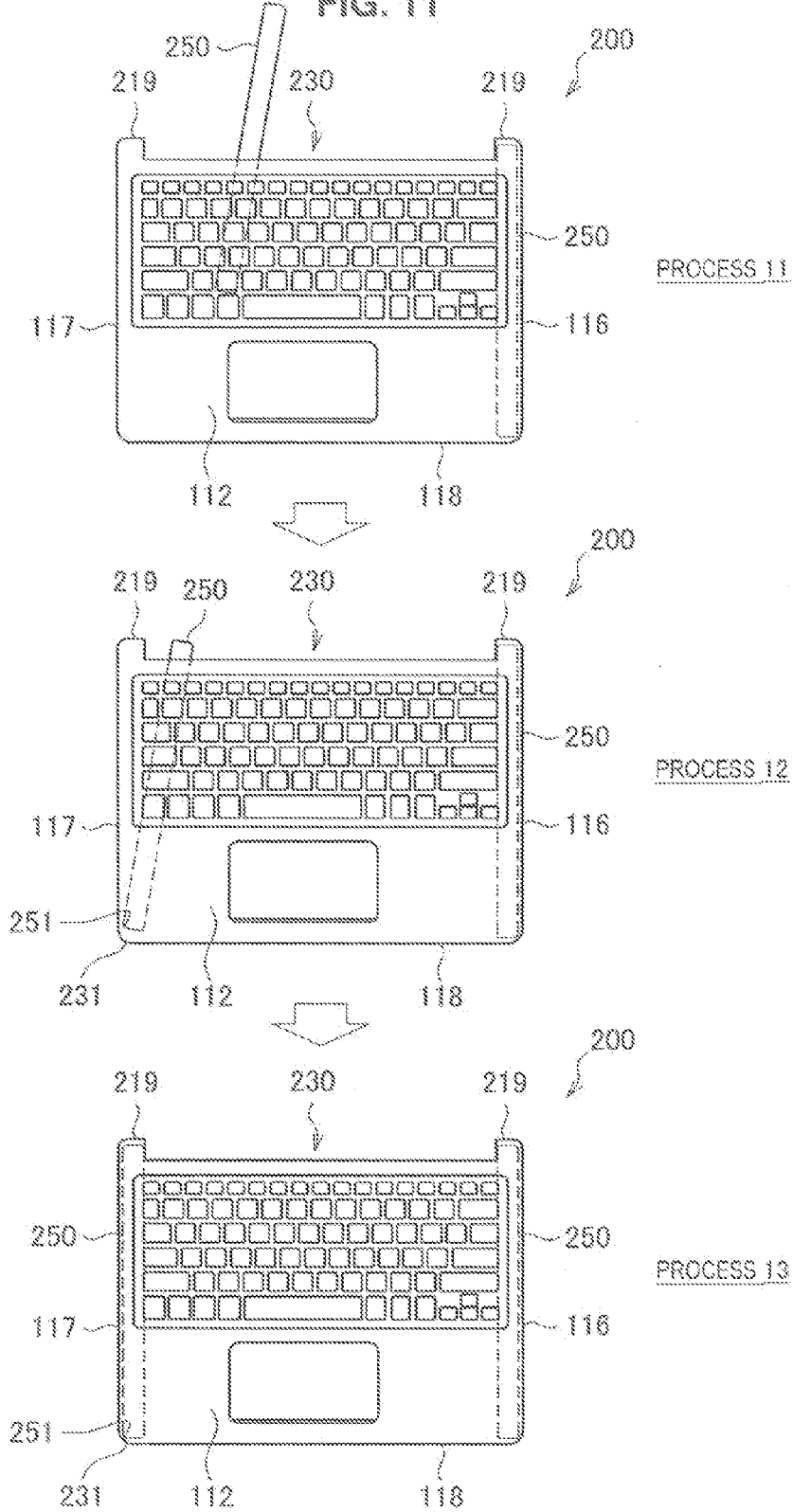

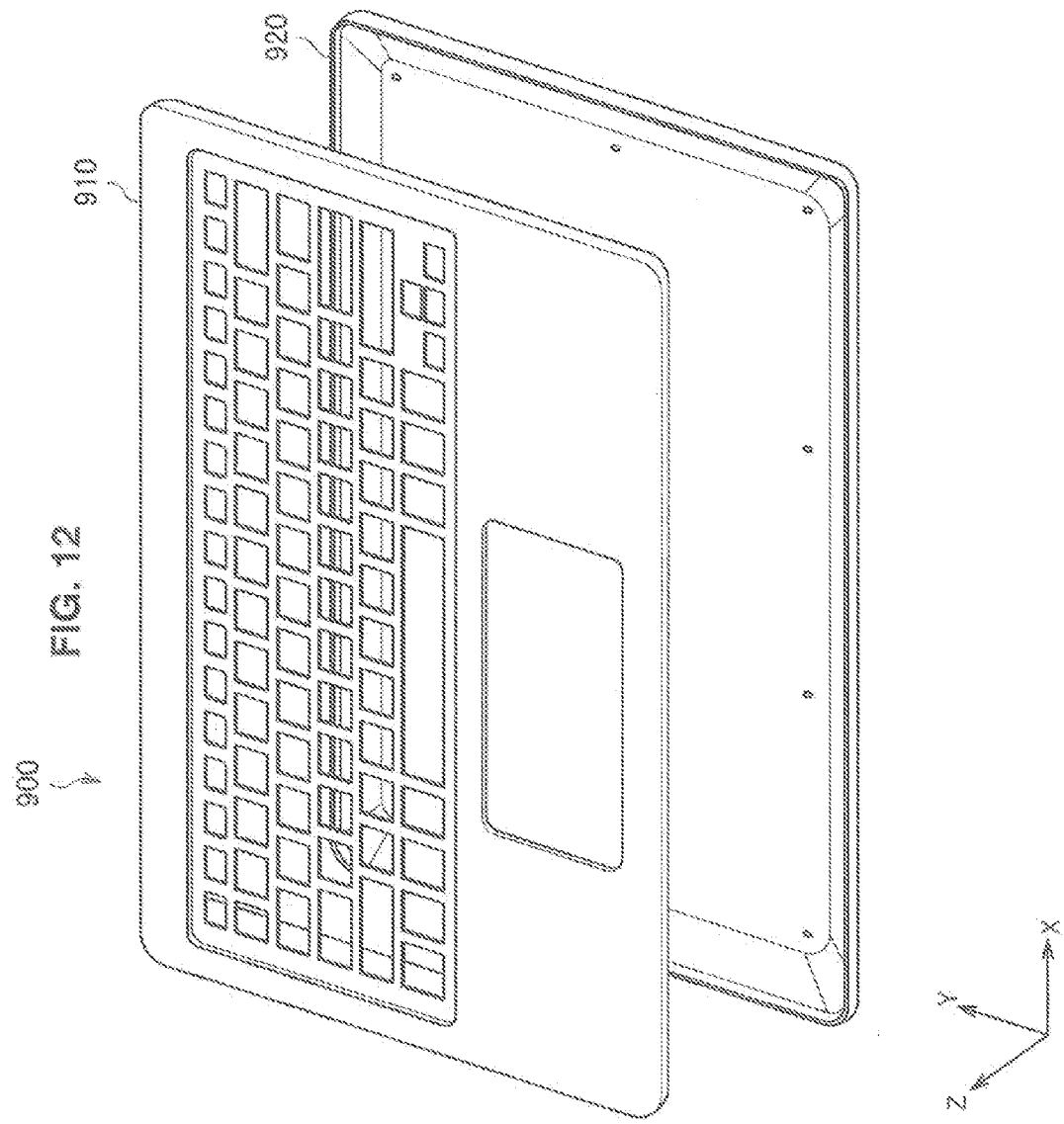

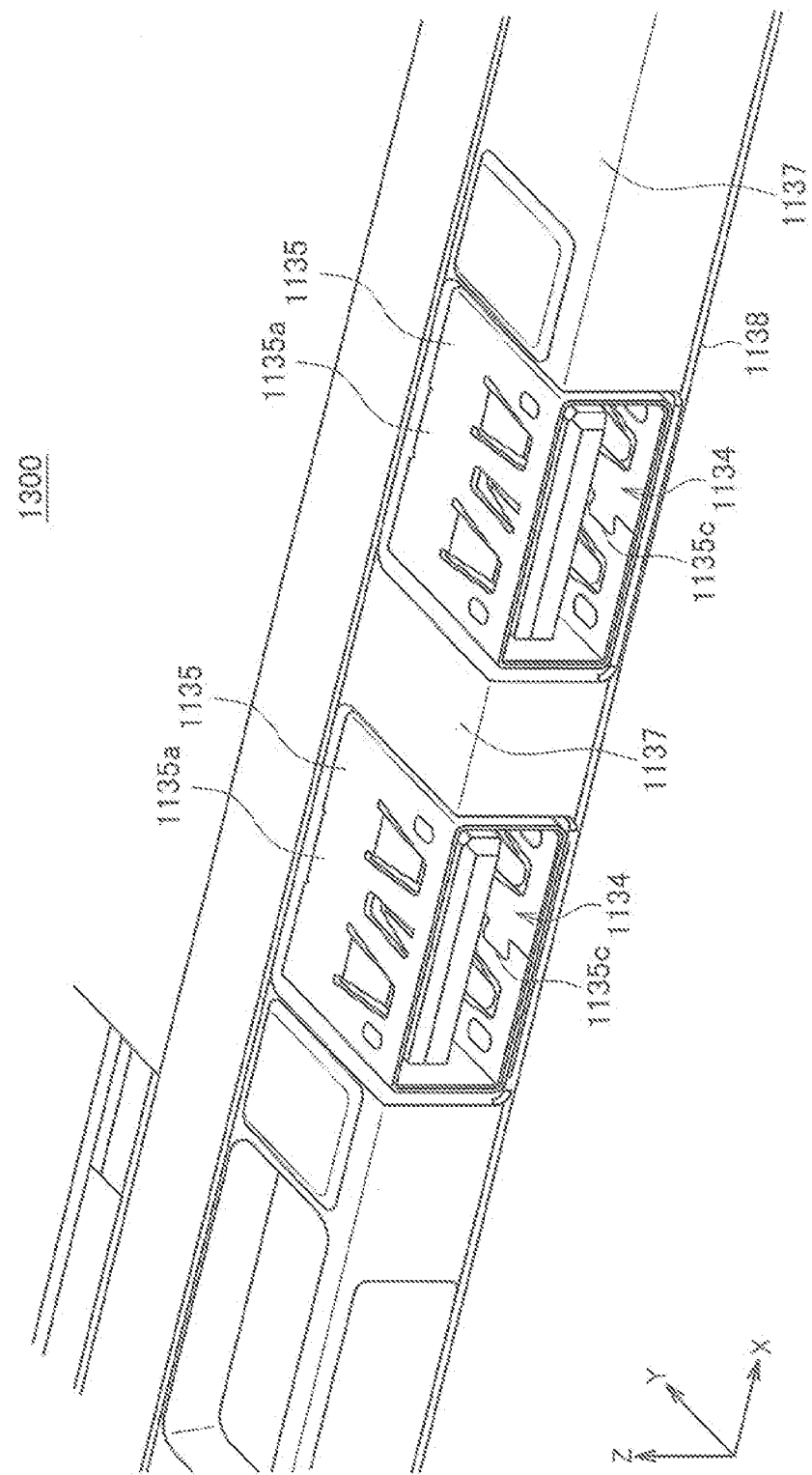

INFORMATION PROCESSING DEVICE AND METHOD OF MANUFACTURING INFORMATION PROCESSING DEVICE

CROSS REFERENCE TO RELATED APPLICATIONS

This application claims the benefit of Japanese Priority Patent Application JP 2013-273224 filed Dec. 27, 2013, Japanese Priority Patent Application JP 2013-271482 filed Dec. 27, 2013, and Japanese Priority Patent Application JP 2013-273223 filed Dec. 27, 2013, the entire contents of each of which are incorporated herein by reference.

BACKGROUND

The present disclosure relates to an information processing device and a method of manufacturing the information processing device.

As information processing devices, for example, electronic devices such as note-type personal computers have been used. In the bodies of the electronic devices, components such as substrates and keyboards are stacked between bottom plates which are bottom surfaces and exterior members which are top surfaces, and the bottom plates and the exterior members are fastened by fastening members or the like for assembly (see JP 2010-146482A).

SUMMARY

When a bottom plate and an exterior member which are separate members are fastened by a fastening member, various problems may occur in terms of a design property or an assembly property. For example, a problem may occur in that a gap may occur between the bottom plate and the exterior member or the assembly may be difficult since the bottom plate and the exterior member are fastened by the fastening member.

It is desirable to suggest a casing structure for improving the design property or the assembly property of an information processing device.

According to the present disclosure, there is provided an information processing device including a casing in which a top surface, a bottom surface, and side surfaces are integrally formed, and an opening portion which is formed in one of the top surface, the bottom surface, and the side surfaces and through which each component to be mounted inside the casing is inserted.

Further, according to the present disclosure, there is provided a method of manufacturing an information processing device, the method including preparing a casing in which a top surface, a bottom surface, and side surfaces are integrally formed, inserting a component into the casing from an opening portion formed in one of the top surface, the bottom surface, and the side surfaces of the casing, and mounting the component inserted from the opening portion at a predetermined position inside the casing.

According to an embodiment of the present disclosure described above, it is possible to realize a casing structure for improving the design property or the assembly property of an information processing device.

The foregoing advantages are not necessarily restrictive, but any advantage desired to be obtained in the present specification or other advantages understood from the present specification may be obtained along with the foregoing advantages or instead of the foregoing advantages.

BRIEF DESCRIPTION OF THE DRAWINGS

FIG. 5 is a sectional view taken along the line A-A of FIG. 3;

FIG. 6 is a sectional view taken along the line B-B of FIG. 3;

FIG. 8A is a schematic diagram for describing an assembly example of the information processing device 10;

FIG. 8B is a schematic diagram for describing an assembly example of the information processing device 10;

FIG. 9 is a perspective view illustrating an example of the configuration of a casing 200 according to a second embodiment:

FIG. 10 is a schematic diagram illustrating positions at which speakers 250 are mounted in the casing 200;

FIG. 11 is a schematic diagram for describing an example of a method of mounting the speakers 250 inside the casing 200;

FIG. 12 is a perspective view illustrating the configuration of a casing 900 according to a comparative example:

FIG. 21 is a perspective view illustrating an attachment of a connector 1134 according to the embodiment;

DETAILED DESCRIPTION OF THE EMBODIMENTS

Figure 1:
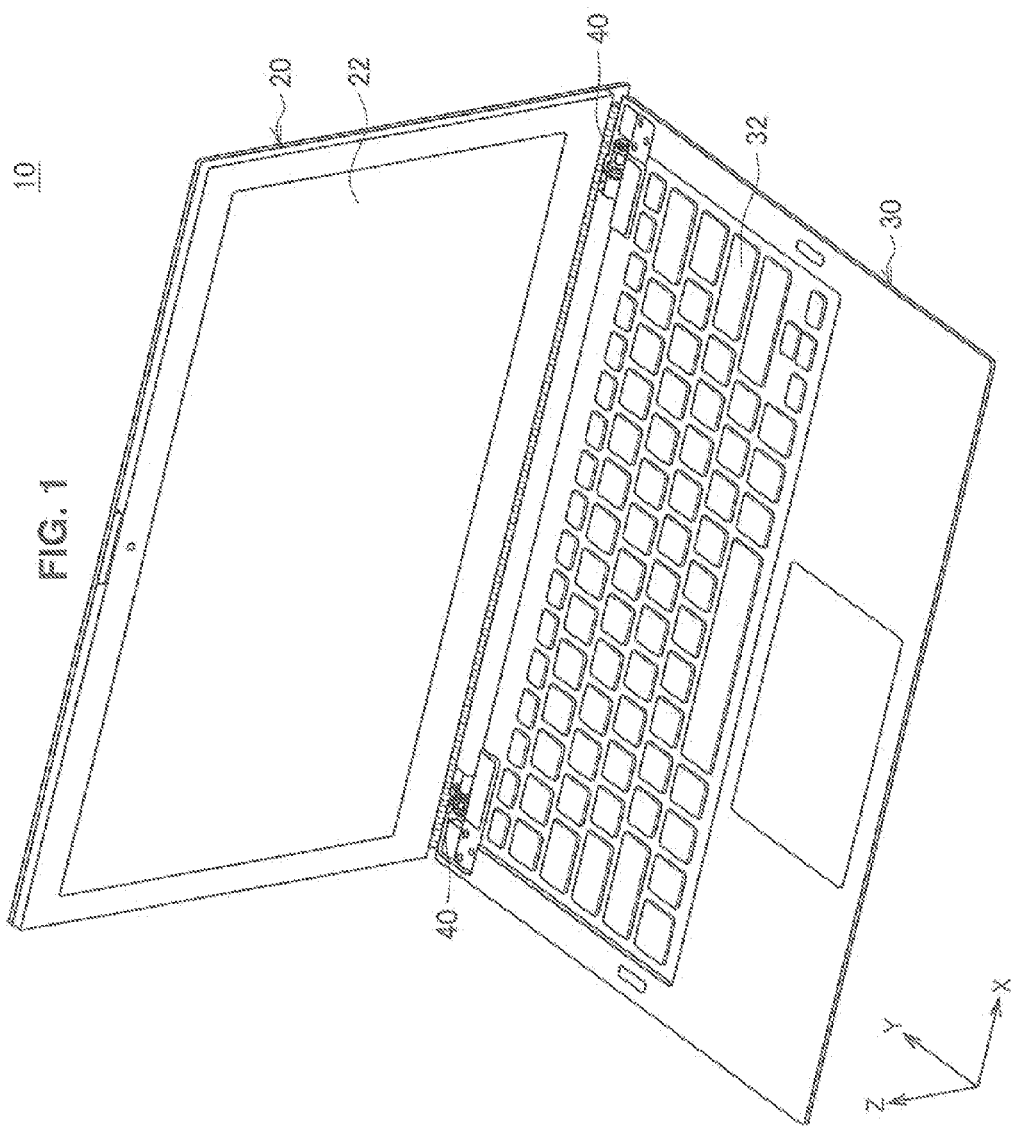
FIG. 1 is a perspective view illustrating an example of the external configuration of an information processing device 10 according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

1. First Embodiment

1-1. External Configuration of Information Processing Device

An example of the external configuration of an information processing device according to a first embodiment of the present disclosure will be described. Hereinafter, a note-type personal computer illustrated in FIG. 1 will be exemplified as the information processing device. An information processing device 10 is not limited to the note-type personal computer, but may be, for example, an electronic device such as a tablet terminal.

Figure 2:
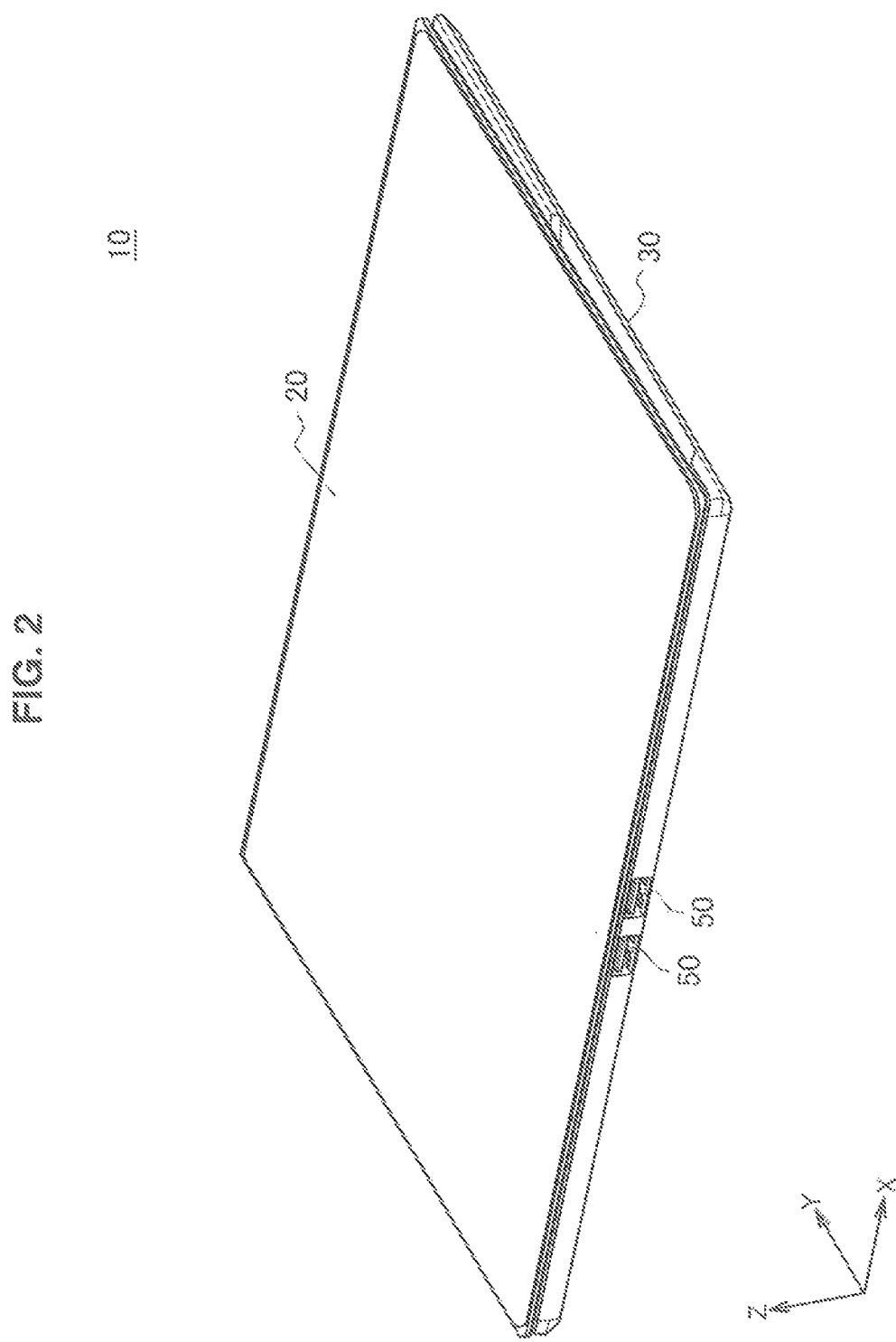
FIG. 2 is a perspective view illustrating an example of the external configuration of the information processing device 10.

FIGS. 1 and 2 are perspective views illustrating an example of the external configuration of the information processing device 10 according to the first embodiment of the present disclosure. FIG. 1 illustrates an opened state of a display unit 20 of the information processing device 10 and FIG. 2 illustrates a closed state of the display unit 20. FIG. 1 is a diagram showing the information processing device 10 from the front side and FIG. 2 is a diagram showing the information processing device 10 from the rear side.

As illustrated in FIGS. 1 and 2, the information processing device 10 includes the display unit 20, a body unit 30, hinge mechanism units 40, and connectors 50. The display unit 20 and the body unit 30 are each formed in, for example, a flat plate shape and are formed with the same size.

The display unit 20 includes a display screen 22 that displays various kinds of information. The display unit 20 is formed of, for example, a display device such as a liquid crystal display. A touch panel on which a user can perform a touch manipulation may be superimposed on the display screen 22.

The body unit 30 includes an input unit 32 that receives an input manipulation of the user. The input unit 32 detects the input manipulation of the user and outputs an electric signal corresponding to the input manipulation. When the display unit 20 is in the opened state (see FIG. 1), the user performs an input manipulation using the input unit 32. The detailed configuration of the body unit 30 will be described below.

The hinge mechanism units 40 connect the display unit 20 to the body unit 30 so that the display unit 20 is rotatable with respect to the body unit 30. The hinge mechanism units 40 are installed on both sides of the body unit 30 in a longitudinal direction (the X direction illustrated in FIG. 1). The hinge mechanism units 40 are installed on one end side of the body unit 30 in a lateral direction (the Y direction illustrated in FIG. 1). The display unit 20 is rotated between the opened state (see FIG. 1) with respect to the body unit 30 and the closed state (see FIG. 2) with respect to the body unit 30 by the hinge mechanism units 40.

Cables (for example, USB cables) are connected to the connectors 50. Thus, the information processing device 10 can communicate with an external device via the cables. The connectors 50 are fitted to a substrate mounted inside the body unit 30. The connectors 50 are mounted on one end side (the side of the hinge mechanism units 40) in the lateral direction of the body unit 30, as illustrated in FIG. 2.

1-2. Internal Configuration of Body Unit 30

An example of the configuration of the body unit 30 according to the first embodiment will be described. The body unit 30 is configured such that a frame, a substrate, and a keyboard are stacked inside a casing. Hereinafter, the detailed configuration of a casing 100 of the body unit 30 will be described.

Figure 3:
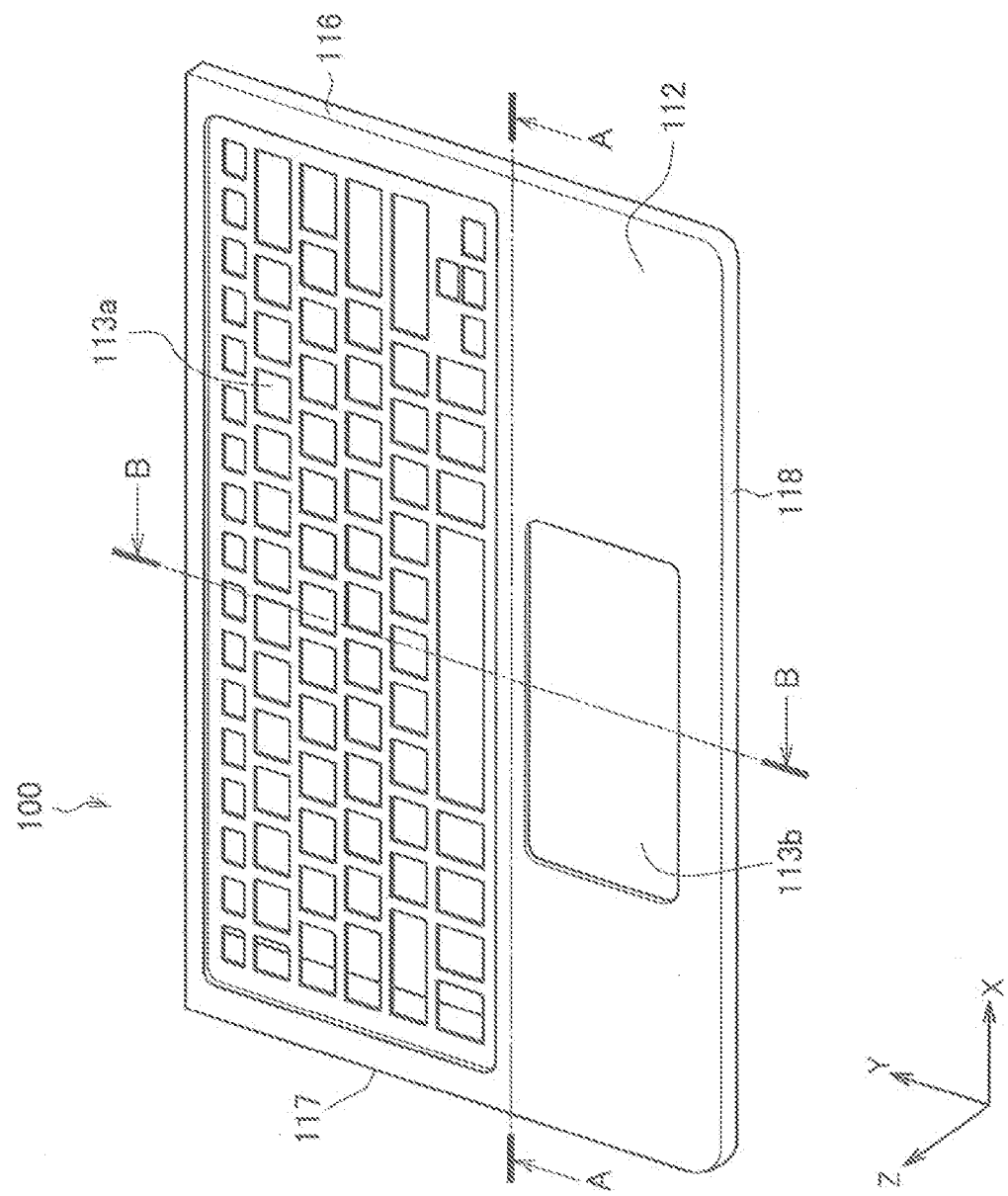
FIG. 3 is a perspective view illustrating an example of the configuration of a casing 100 according to the first embodiment.
Figure 4:
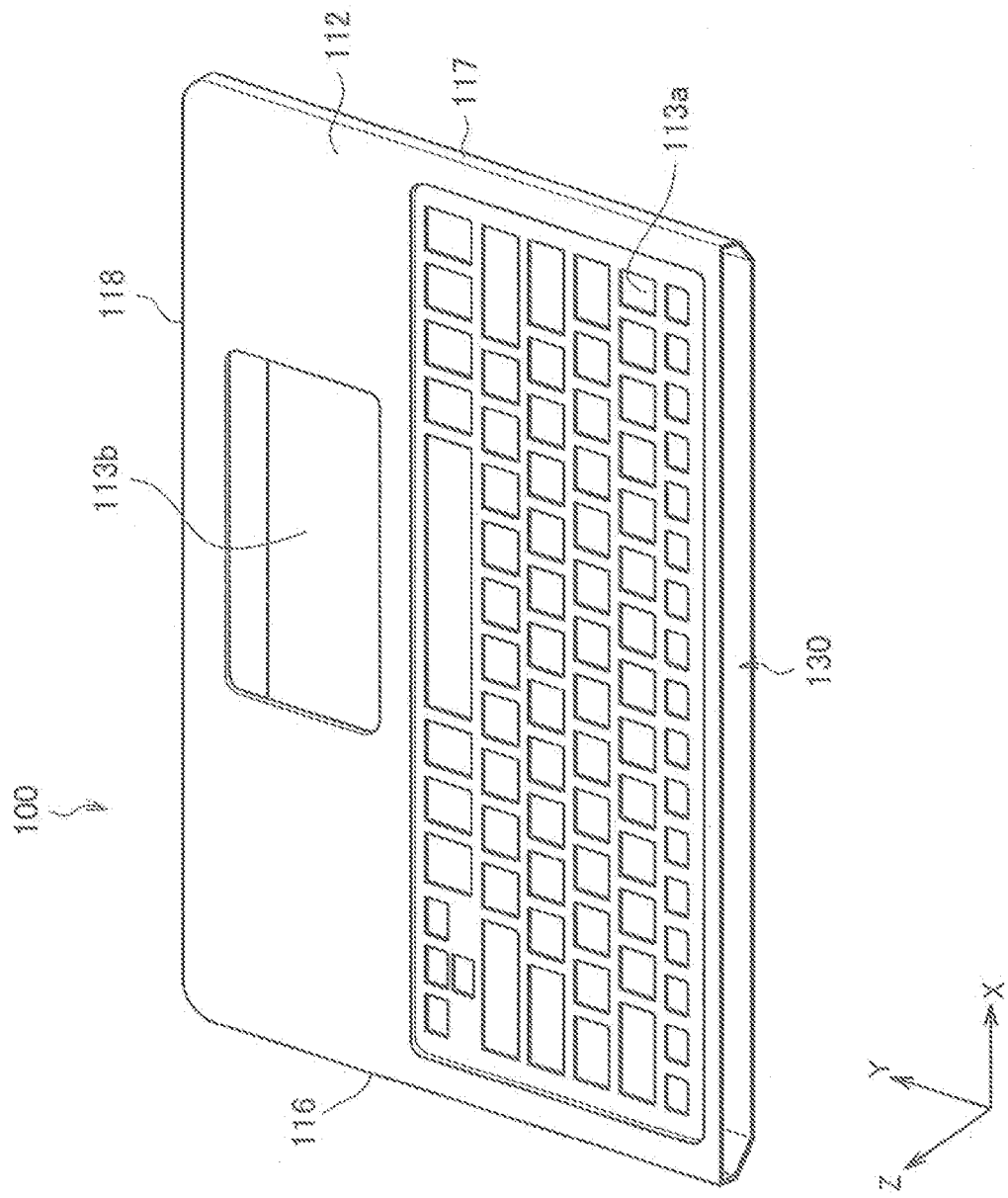
FIG. 4 is a perspective view illustrating an example of the configuration of the casing 100 when viewed from the rear surface side of the casing of FIG. 3.

FIG. 3 is a perspective view illustrating an example of the configuration of the casing 100 according to the first embodiment. FIG. 4 is a perspective view illustrating an example of the configuration of the casing 100 when viewed from the rear surface side of the casing of FIG. 3. FIG. 5 is a sectional view taken along the line A-A of FIG. 3. FIG. 6 is a sectional view taken along the line B-B of FIG. 3. In FIG. 6, a core 160 used at the time of manufacturing the casing 100 is also illustrated to facilitate the description.

As illustrated in FIGS. 3 to 6, the casing 100 includes a top surface 112, a bottom surface 114, and three side surfaces 116, 117, and 118. The inside of the casing 100 surrounded by the top surface 112, the bottom surface 114, and the three side surfaces 116, 117, and 118 is a space in which components can be mounted.

The top surface 112 is a manipulation surface on which a user of the information processing device 10 performs a manipulation. The top surface 112 is a rectangular flat surface. As illustrated in FIG. 3, a manipulation key hole 113a in which a manipulation key is fitted and a touch pad hole 113b in which a touch pad is fitted are formed in the top surface 112.

The bottom surface 114 is a placing surface for placing the information processing device 10 on a desk or the like. The bottom surface 114 faces the top surface 112 with the same shape and is connected to the top surface 112 by the three side surfaces 116, 117, and 118. As will be described below, since the top surface 112, the bottom surface 114, and the three side surfaces 116, 117, and 118 are integrated, no gap is formed in the boundaries of the top surface 112, the bottom surface 114, and the three side surfaces 116, 117, and 118. Therefore, it is possible to prevent the design property of the exterior from being damaged due to occurrence of a gap. Further, screws or the like fixing the top surface 112, the bottom surface 114, and the three side surfaces 116, 117, and 118 are unnecessary.

The three side surfaces 116, 117, and 118 are side surfaces corresponding to three sides among the four sides of the casing 100. Here, the X direction illustrated in FIG. 3 in the casing 100 is assumed to be a long side and the Y direction is assumed to be a short side. The side surfaces 116 and 117 are formed on the two short sides of the casing 100 and the side surface 118 is formed on one of the two long sides of the casing 100. In the embodiment, the other side (a portion corresponding to a side surface) of the two long sides of the casing 100 is an opened opening portion 130, as illustrated in FIG. 4. The details of the opening portion 130 will be described below.

Incidentally, in the embodiment, the top surface 112, the bottom surface 114, and the three side surfaces 116, 117, and 118 of the casing 100 (excluding the side surface which is the opening portion 130 facing the side surface 118) are integrally formed so that the design property or the assembly property is improved.

For example, the casing 100 is formed of a fiber reinforced plastic. When the casing 100 is formed of a fiber reinforced plastic, it is possible to realize thinness and weight reduction of the casing 100. Further, the thicknesses of the top surface 112, the bottom surface 114, and the three side surfaces 116, 117, and 118 of the casing 100 may be different.

Specifically, the casing 100 is formed of a carbon fiber reinforced plastic. The carbon fiber reinforced plastic refers to a fiber reinforced plastic in which a carbon fiber is used as a reinforcement material. As a base material, an epoxy resin is mainly used. The carbon fiber reinforced plastic is a material having both high intensity and lightness. By forming the casing 100 with the carbon fiber reinforced plastic in this way, it is possible to realize the thinness and weight reduction of the casing 100 more efficiently.

Here, a method of forming the casing 100 with the carbon fiber reinforced plastic will be described in brief. By stacking a carbon prepreg in the perimeter of a mold called a core (the core 160 illustrated in FIG. 6), performing molding by autoclaving or hot-press forming, and extracting the core 160, it is possible to realize the integration of the top surface 112, the bottom surface 114, and the three side surfaces 116, 117, and 118. By forming the core 160 with any shape, it is possible to mold the casing 100 with any shape. By dividing the core 160, it is possible to make a shape which may not be formed in normal extracting. Further, the thickness of the casing when the perimeter of the core 160 is stacked can be changed to any size.

The example in which the carbon fiber reinforced plastic is used as a fiber reinforced plastic has been described above, but the embodiment of the present disclosure is not limited thereto. Various kinds of fiber reinforced plastics can be applied. For example, the fiber reinforced plastic may be any of a glass fiber reinforced plastic, a boron fiber reinforced plastic, an aramid fiber reinforced plastic, and a polyethylene fiber reinforced plastic.

The casing 100 is described above as being formed of a fiber reinforced plastic, but the embodiment of the present disclosure is not limited thereto. Another material may be used as long as the top surface 112, the bottom surface 114, and the three side surfaces 116, 117, and 118 of the casing 100 can be integrated. For example, the casing 100 in which the top surface 112, the bottom surface 114, and the three side surfaces 116, 117, and 118 are integrated may be formed by welding a metal plate.

As described above, when the casing 100 is formed with a fiber reinforced plastic, the thickness of the side surfaces 116, 117, and 118 can be larger than the thickness of the top surface 112 or the bottom surface 114. In other words, the top surface 112 or the bottom surface 114 can be thinned. Thus, it is possible to thin the thickness of the casing 100 (specifically, the thickness in the Z direction illustrated in FIG. 3) while ensuring rigidity of the side surfaces 116, 117, and 118.

Figure 7:
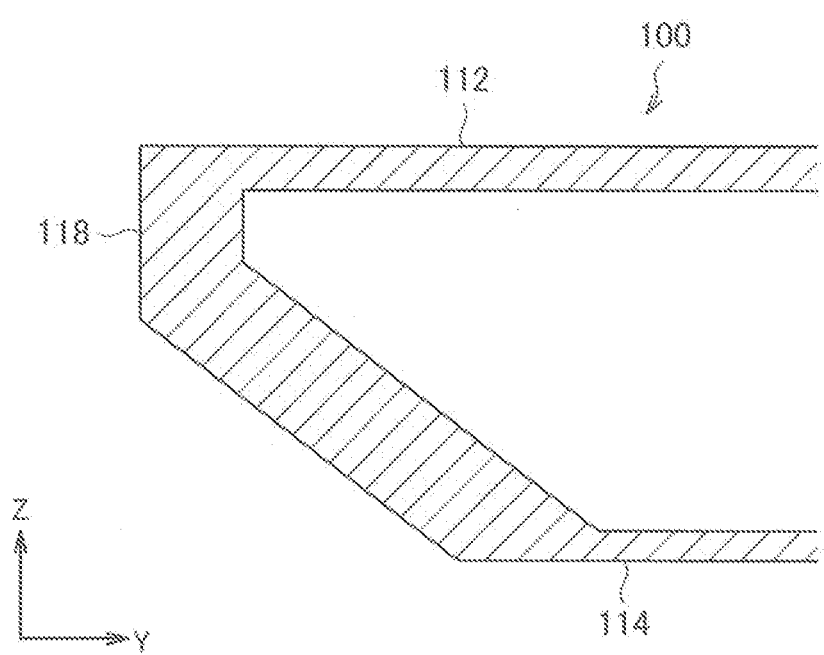
FIG. 7 is a schematic diagram for describing a relation among the thicknesses of a side surface 118, a top surface 112, and a bottom surface 114.

FIG. 7 is a schematic diagram for describing a relation among the thickness of the side surface 118, the top surface 112, and the bottom surface 114. Here, the side surface 118 will be described as an example, but the same thickness can also be set for the side surfaces 116 and 117. As illustrated in FIG. 7, the thickness of the side surface 118 is larger than the thickness of the top surface 112 or the bottom surface 114 (for example, the thickness of the side surface 118 is twice or more the thickness of the top surface 112 or the bottom surface 114). In FIG. 7, the thickness of the entire side surface 118 is large, but the embodiment of the present disclosure is not limited thereto. For example, only a part of the side surface 118 may be set to be thick. Thus, it is possible to reinforce a portion in which the rigidity of the casing 100 is necessary.

(Opening Portion 130)

Next, the function and the like of the opening portion 130 (see FIG. 4) of the casing 100 integrally molded as described above will be described. The opening portion 130 has a function of an insertion port through which components mounted inside the casing 100 are inserted.

In the embodiment, when the information processing device 10 (the body unit 30) is assembled, the components inserted through the opening portion 130 are mounted inside the casing 100. By installing the opening portion 130, the components can be mounted inside the casing 100 without dividing the casing 100.

As illustrated in FIG. 4, the opening portion 130 has an opening formed along one long side of the two long sides of the casing 100. Specifically, the opening portion 130 is formed such that the entire side surface corresponding to the one long side is opened. The size of the opening can be adjusted according to the sizes of the components mounted inside the casing 100. Here, in view of its function as the insertion port for the components, the opening is desirably set to be large.

As the components mounted inside the casing 100, various electric components or the like can be exemplified. For example, the components include a keyboard and a substrate. However, the embodiment of the present disclosure is not limited thereto. For example, the components may include a speaker or a frame.

The components mounted inside the casing 100 are inserted to be slid toward the inside of the casing 100 through the opening portion 130 when the information processing device 10 is assembled. Therefore, it is easy to insert the components into the casing 100, and thus it is easy to mount the components at desired positions.

The above-described connectors 50 (see FIG. 2) are installed on the side of the opening portion 130. In this case, since the connectors 50 are fitted in the substrate inserted from the opening portion 130, the opening portion 130 can be efficiently utilized. An opening for installing the connectors 50 in the side surfaces 116, 117, and 118 is unnecessary, and thus high rigidity of the casing 100 can be ensured.

As described above, the opening portion 130 is formed on one of the two long sides of the casing 100, but the embodiment of the present disclosure is not limited thereto. For example, the opening portion 130 may be formed on one of the short sides of the casing 100. In this case, the components mounted inside the casing 100 can also be inserted. The opening portion 130 may be formed by opening a part of the top surface 112 of the casing. Therefore, the opening portion 130 may be formed in any of the top surface, the bottom surface, and the side surfaces of the casing 100 as long as the components mounted inside the casing 100 can be inserted.

1-3. Assembly Example of Information Processing Device 10

Next, an assembly example which is a method of manufacturing the information processing device 10 having the above-described configuration will be described with reference to FIGS. 8A and 8B.

FIGS. 8A and 8B are schematic diagrams for describing the assembly example of the information processing device 10 according to the first embodiment. In FIGS. 8A and 8B, components and the like are simply illustrated to facilitate the description.

In this assembly example, the assembly first starts by preparing the casing 100 in which the top surface 112, the bottom surface 114, and the three side surfaces 116, 117, and 118 are integrally formed. The casing 199 is molded with, for example, a carbon fiber reinforced plastic.

Next, the components are inserted inside the casing 100 from the opening portion 130 of the casing 100. Specifically, as illustrated in process 1 of FIG. 8A, a component is inserted by sliding the component into the casing 100 from the opening portion 130. The component inserted in process 1 is, for example, a keyboard 181. As illustrated in process 2, the keyboard 181 is slid in a state in which the keyboard 181 is loaded on a stage 182 which is a jig.

Next, when the keyboard 181 is slid up to a position corresponding to the manipulation key hole 13*a* (see FIG. 3), the keyboard 181 is raised by the stage 182, as illustrated in process 3. Thus, manipulation keys of the keyboard 181 are mounted at a predetermined position protruding from the manipulation key hole 113*a* (see FIG. 1).

Next, in process 4 illustrated in FIG. 8B, a set of modules 190 is slid toward the inside of the casing 100. The set of modules 190 includes a substrate module 191 mounted inside the casing 100, a display module 192 forming the display unit 20 (see FIG. 1), and a hinge portion 193 connecting the substrate module 191 to the display module 192. The substrate module 191 is a module that includes a frame or electronic components in addition to a substrate. The hinge portion 193 corresponds to the hinge mechanism unit 40 illustrated in FIG. 1.

By sliding the set of modules 190, the substrate module 191 is mounted inside the casing 100, as illustrated in process 5. Thereafter, by appropriately mounting an exterior member or the like, the information processing device 10 is assembled.

In the above-described assembly example, the components (the keyboard 181 and the substrate module 191) are slid into the casing 100 through the opening portion 130 to be mounted when the information processing device 10 is assembled. Therefore, it is easy to mount the components inside the casing 100. Since the top surface 112, the bottom surface 114, and the three side surfaces 116, 117, and 118 of the casing 100 are integrally formed, it is not necessary to fasten these surfaces by screws or the like. Therefore, the assembly property of the information processing device 10 is improved.

As described above, the set of the modules 190 including the substrate module 191 and the display module 192 is slid toward the inside of the casing 100, but the embodiment of the present disclosure is not limited thereto. For example, after sliding only the substrate module 191 inside the casing 100, the hinge portion 193 may be connected to the display module 192 via the hinge portion 193.

2. Second Embodiment

Next, the configuration of an information processing device 10 according to a second embodiment will be described. In the second embodiment, the configuration of a casing 200 is different from the configuration of the casing 100 according to the first embodiment. Thus, the configuration of the casing 200 will be mainly described and description of the other configurations will be omitted.

FIG. 9 is a perspective view illustrating an example of the configuration of the casing 200 according to the second embodiment. As illustrated in FIG. 9, the casing 200 is different from the casing 100 according to the first embodiment in that the casing 200 includes a side surface 219 in addition to the top surface 112, the bottom surface 114, and the three side surfaces 116, 117, and 118. The side surface 219 is a surface that faces the side surface 118. By installing the side surface 219, the four side surfaces of the casing 200 are linked. Thus, it is possible to improve the rigidity of the casing 200.

In the casing 200, the top surface 112, the bottom surface 114, and the three side surfaces 116, 117, 118, 219 are integrally formed. Specifically, as in the first embodiment, the casing 200 is formed of a fiber reinforced plastic. Thus, it is possible to realize the thinness and the weight reduction of the casing 200.

The casing 200 includes an opening portion 230 that has a function of an insertion port through which components mounted inside the casing 100 are inserted. As illustrated in FIG. 9, the opening portion 230 is formed by opening a central site of the side surface 219 in the longitudinal direction (the X direction in FIG. 9). That is, the opening portion 230 is formed so that a part of the side surface 219 is notched. Therefore, the side surface 219 is present only at both ends in the longitudinal direction of the casing 200.

Specific devices are mounted on internal regions of the casing 200 corresponding to the side surface 219. For example, as illustrated in FIG. 10, speakers 250 are mounted on the internal regions of the casing 200 corresponding to the side surface 219 in the longitudinal direction.

FIG. 10 is a schematic diagram illustrating positions at which the speakers 250 are mounted in the casing 200. As illustrated in FIG. 10, the speakers 250 are mounted at both ends in the longitudinal direction of the casing 200. The speaker 250 has a size which is substantially the same as the length of the casing 200 in the lateral direction (the Y direction in FIG. 10). Thus, the two speakers 250 are embedded on both sides of the region corresponding to the opening portion 230 inside the casing 200.

Next, a method of mounting the speakers 250 inside the casing 200 will be described with reference to FIG. 11.

FIG. 11 is a schematic diagram for describing an example of the method of mounting the speakers 250 inside the casing 200. Here, the method of mounting the speaker 250 on the left side between the two speakers 250 illustrated in FIG. 11 will be described.

The speaker 250 is also inserted toward the inside of the casing 200 from the opening portion 230. At this time, as illustrated in process 11 of FIG. 11, the speaker 250 is inserted to tilt toward the opening portion 230. Then, as illustrated in process 12, a front end 251 of the speaker 250 is inserted until the front end 251 comes into contact with a corner portion of the inside of the casing 200.

Thereafter, as illustrated in process 13, the speaker 250 is rotated counterclockwise using the front end 251 as a pivot point to be located so that the speaker 250 is parallel to and comes into contact with the side surface 117. Thus, the speaker 250 is mounted at a desired position. The other of the two speakers 250, the right speaker 250, is mounted likewise.

In the second embodiment, after the two speakers 250 are mounted on the casing 200, the keyboard 181 or the set of modules 190 described in FIGS. 8A and 8B are mounted. By mounting the components inside the casing 200 in this order, the components can be mounted to be embedded all over the internal space of the casing 200 even when the side surface 219 is formed.

3. Efficacy of Information Processing Device According to Embodiment of the Present Disclosure As described above, the information processing device 10 according to an embodiment of the present disclosure has the casing 100 (or the casing 200) in which the top surface 112, the bottom surface 114, and the three side surfaces 116, 117, and 118 are integrally formed, as illustrated in FIG. 4. The casing 100 (200) has the opening portion 130 (230) through which the components mounted inside the casing are inserted.

In the configuration, it is possible to improve the design property or the assembly property of the information processing device 10. Hereinafter, after a comparative example is described with reference to FIGS. 12 to 16, the efficacy of the information processing device 10 will be described.

FIG. 12 is a perspective view illustrating the configuration of a casing 900 according to the comparative example. The casing 900 according to the comparative example is configured to be divided into a palm rest 910 and a housing bottom 920, as illustrated in FIG. 12. The palm rest 910 forms a top surface of the casing 900 and the housing bottom 920 forms a bottom surface and side surfaces of the casing. In this configuration, after components (a keyboard and the like) are fitted in one of the palm rest 910 and the housing bottom 920, the components are covered with the other thereof.

Figure 13:
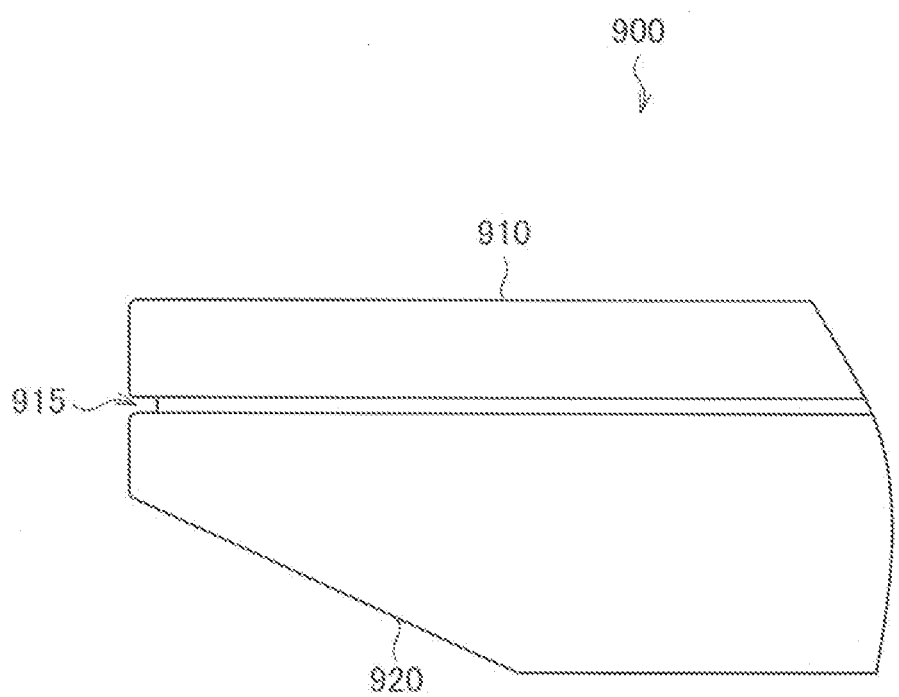
FIG. 13 is a diagram illustrating a gap between a palm rest 910 and a housing bottom 920 according to the comparative example.

FIG. 13 is a diagram illustrating a gap between a palm rest 910 and a housing bottom 920 according to the comparative example. Since the casing 900 is divided into two components, the palm rest 910 and the housing bottom 920, a gap 915 occurs between the palm rest 910 and the housing bottom 920, as illustrated in FIG. 13. There is a concern of a step difference also occurring between the palm rest 910 and the housing bottom 920 instead of the gap 915 or along with the gap 915. When the gap 915 or the step difference is visible, the design property of the casing 900 may be damaged.

Figure 14:
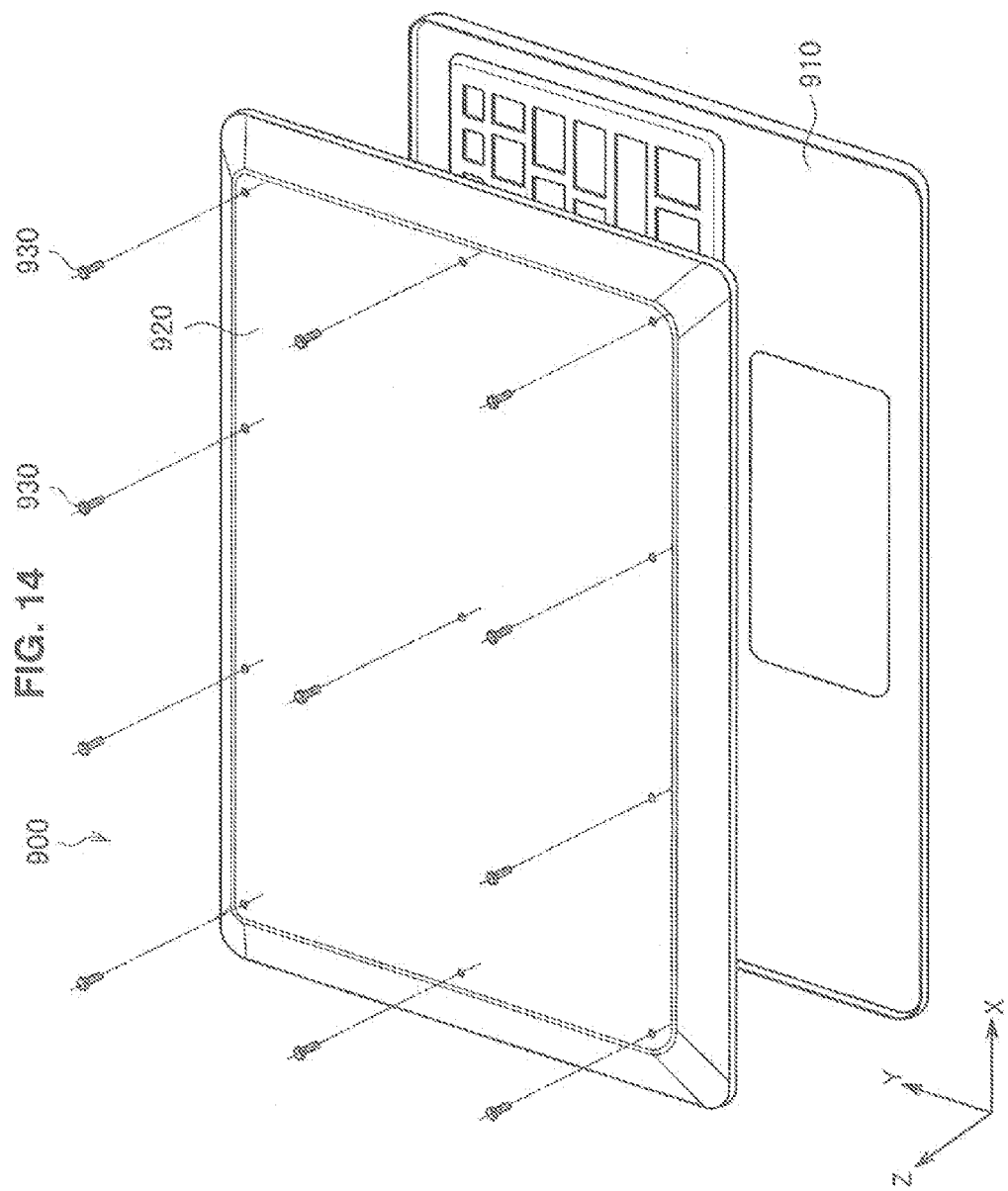
FIG. 14 is a diagram illustrating fastening of the palm rest 910 and the housing bottom 920 by screws 930 according to the comparative example.
Figure 15:
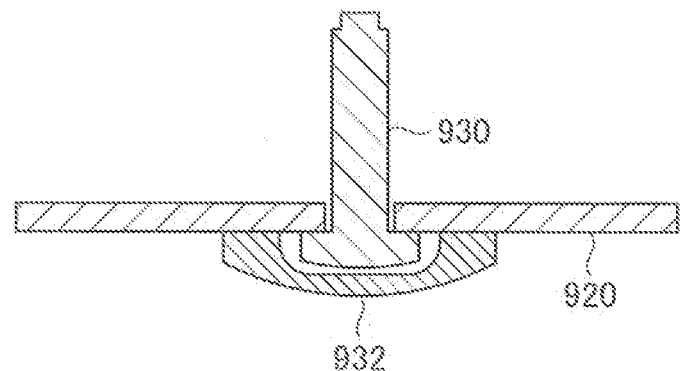
FIG. 15 is a diagram illustrating a state in which the screw 930 is covered with a foot 932 according to the comparative example.

FIG. 14 is a diagram illustrating fastening of the palm rest 910 and the housing bottom 920 by screws 930 according to the comparative example. FIG. 15 is a diagram illustrating a state in which the screw 930 is covered with a foot 932 according to the comparative example. To fix the palm rest 910 and the housing bottom 920 which are separate components, fastening is performed using the screws 930, as illustrated in FIG. 14. To prevent the screw 930 from being externally visible, the screw 930 is covered with a so-called foot 932, as illustrated in FIG. 15. In this case, when the foot 932 is visible, there is a concern of the design property being damaged. When a site at which the foot 932 is disposed is limited, there is a concern of the screw 930 not being disposed at a site in which rigidity is necessary.

Figure 16:
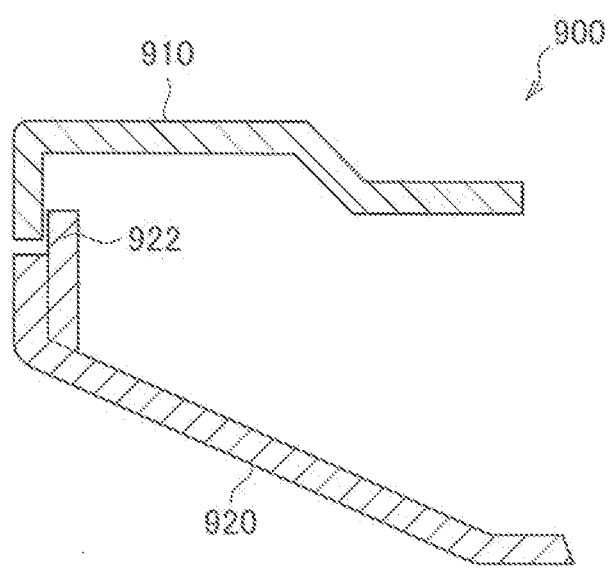
FIG. 16 is a diagram illustrating the configuration of a boundary portion between the palm rest 910 and the housing bottom 920 according to the comparative example.

FIG. 16 is a diagram illustrating the configuration of a boundary portion between the palm rest 910 and the housing bottom 920 according to the comparative example. As a method of hiding the gap between the palm rest 910 and the housing bottom 920, a countermeasure of forming a claw portion (specifically, a claw portion 922 of the housing bottom 920 illustrated in FIG. 16) in one of the palm rest 910 and the housing bottom 920 is possible. However, in this case, the thickness increases to the extent that the claw portion 922 is formed. Consequently, the weight of the housing bottom 920 may become heavy.

In the comparative example, the assembly property may deteriorate since it is necessary to fix the palm rest 910 and the housing bottom 920 using the screws 930. In particular, when many screws 930 are used, as illustrated in FIG. 14, the assembly property may further deteriorate.

In contrast, in the casing 100 (200) of the information processing device 10 according to an embodiment of the present disclosure, the top surface 112, the bottom surface 114, and the three side surfaces 116, 117, and 118 are integrally formed. Thus, the gap or the step difference between the palm rest 910 and the housing bottom 920, as described in the comparative example, does not occur. Therefore, it is possible to prevent the design property from being damaged due to the gap or the step difference. Since the gap or the step difference does not occur, the claw portion 922 illustrated in FIG. 16 is unnecessary. Thus, it is possible to realize the weight reduction of the casing 100.

In the information processing device 10 according to an embodiment of the present disclosure, the top surface 112, the bottom surface 114, and the three side surfaces 116, 117, and 118 are integrally formed, and thus it is not necessary to fix the casing 100 by screws. Therefore, the number of components decreases and thus the assembly property is improved. Further, by installing the opening portion 130 in the casing 100, it is easy to mount the components inside the casing 100 even when the top surface 112, the bottom surface 114, and the three side surfaces 116, 117, and 118 are integrally formed. Thus, it is possible to improve the assembly property. Likewise, a disassembly property is also improved.

4. Third Embodiment

An example of the external configuration of an information processing device according to an embodiment of the present disclosure will be described. In a third embodiment, the description of portions of the configuration of a casing 1300 which are the same as the configuration of the casing 100 according to the first embodiment will be omitted, and the other configurations will be described below.

5. Internal Configuration of Body-Side Casing 1300

An example of the internal configuration of the body-side casing 1300 according to an embodiment will be described with reference to FIG. 17. The body-side casing 1300 is configured such that, for example, a bottom plate, an internal frame, a substrate, a keyboard, and a bezel are stacked in order from the lower side.

Figure 17:
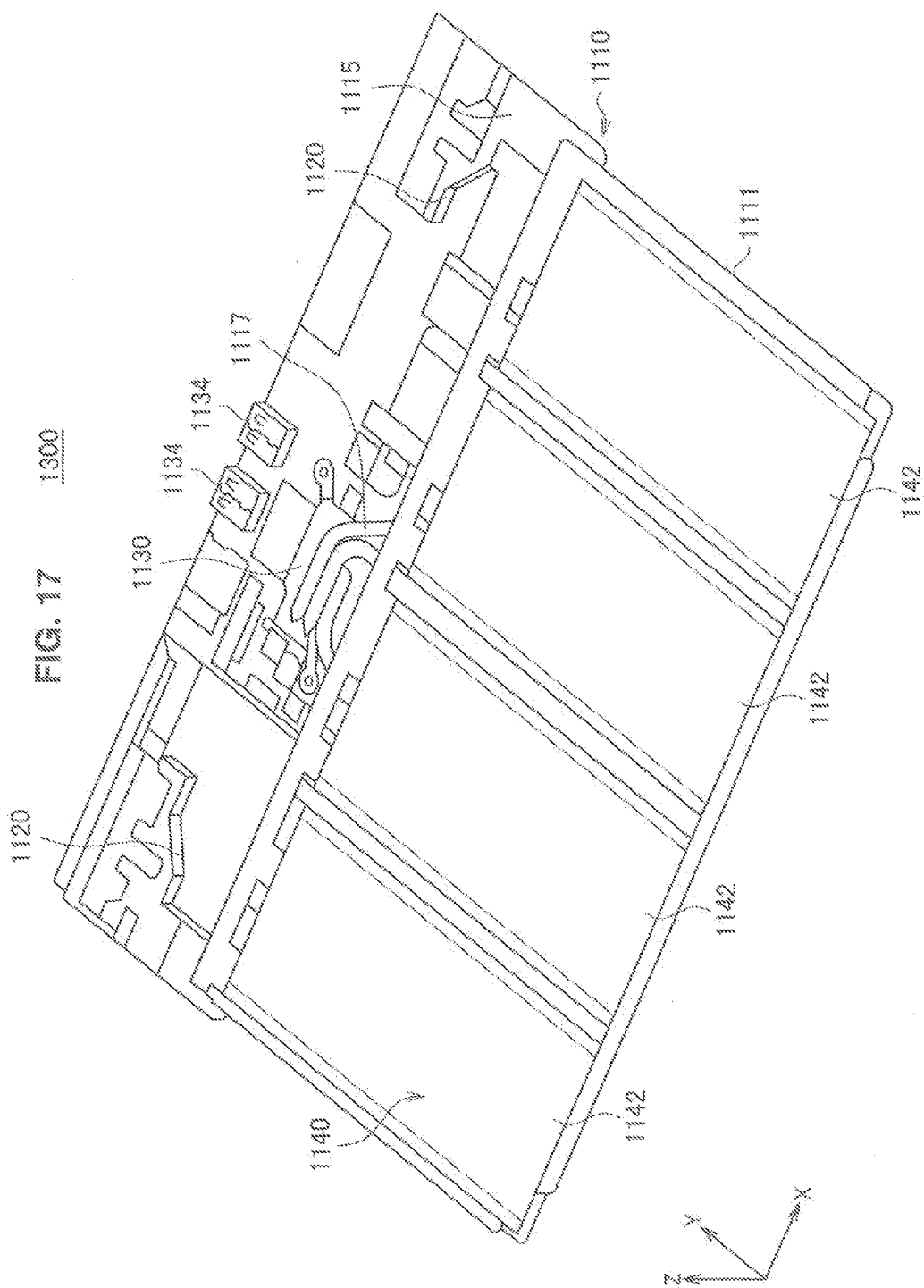
FIG. 17 is a perspective view illustrating an example of the internal configuration of a body-side casing 1300 according to an embodiment.

FIG. 17 is a perspective view illustrating an example of the internal configuration of the body-side casing 1300. In FIG. 17, an internal frame 1110, and a substrate 1130, electric components, and the like fitted in the internal frame 1110 are illustrated. The bottom plate, the keyboard, and the bezel are not illustrated.

As illustrated in FIG. 17, the body-side casing 1300 includes the internal frame 1110 which is an example of a frame structure, the substrate 1130, and a battery module 1140.

The internal frame 1110 has a function of ensuring the rigidity of the body-side casing 1300. The internal frame 1110 is formed of, for example, aluminum. In the case of aluminum, the internal frame 1110 can be thinned and the rigidity can be ensured. As the material of the internal frame 1110, carbon, or a metal such as magnesium, an alloy of magnesium and lithium, or titanium may be adopted in addition to aluminum. In this case, it is possible to realize weight reduction and high rigidity. When graphite is adopted, thermal conductivity can be improved. When stainless steel is adopted, the rigidity can be improved. Further, glass or a resin can also be adopted. In this case, there is superiority in terms of the design property or cost. The detailed configuration of the internal frame 1110 will be described below.

The substrate 1130 is fitted in a second frame portion 1115 of the internal frame 1110. The substrate 1130 is located on the side of the hinge mechanism unit 40 illustrated in FIG. 1 in a lateral direction (the Y direction in FIG. 17) of the body-side casing 1300. As illustrated in FIG. 17, various electronic components controlling an information processing device 110 (not illustrated), connectors 1134, and the like are mounted on the substrate 1130. The detailed configuration of the connectors 1134 will be described below.

The battery module 1140 is fitted in a first frame portion 1111 of the internal frame 1110. The battery module 1140 includes a plurality of cells (in FIG. 17, four cells 1142). In FIG. 17, the four cells 1142 having the same shape are illustrated, but the embodiment of the present disclosure is not limited thereto. The shapes of the four cells 1142 may be different.

6. Detailed Configuration of Internal Frame

The internal frame 1110 according to the embodiment has a configuration to be described below in order to thin the body-side casing 1300 and ensure the rigidity. Thus, the detailed configuration of the internal frame 1110 will be described with reference to FIGS. 18 to 20.

Figure 18:
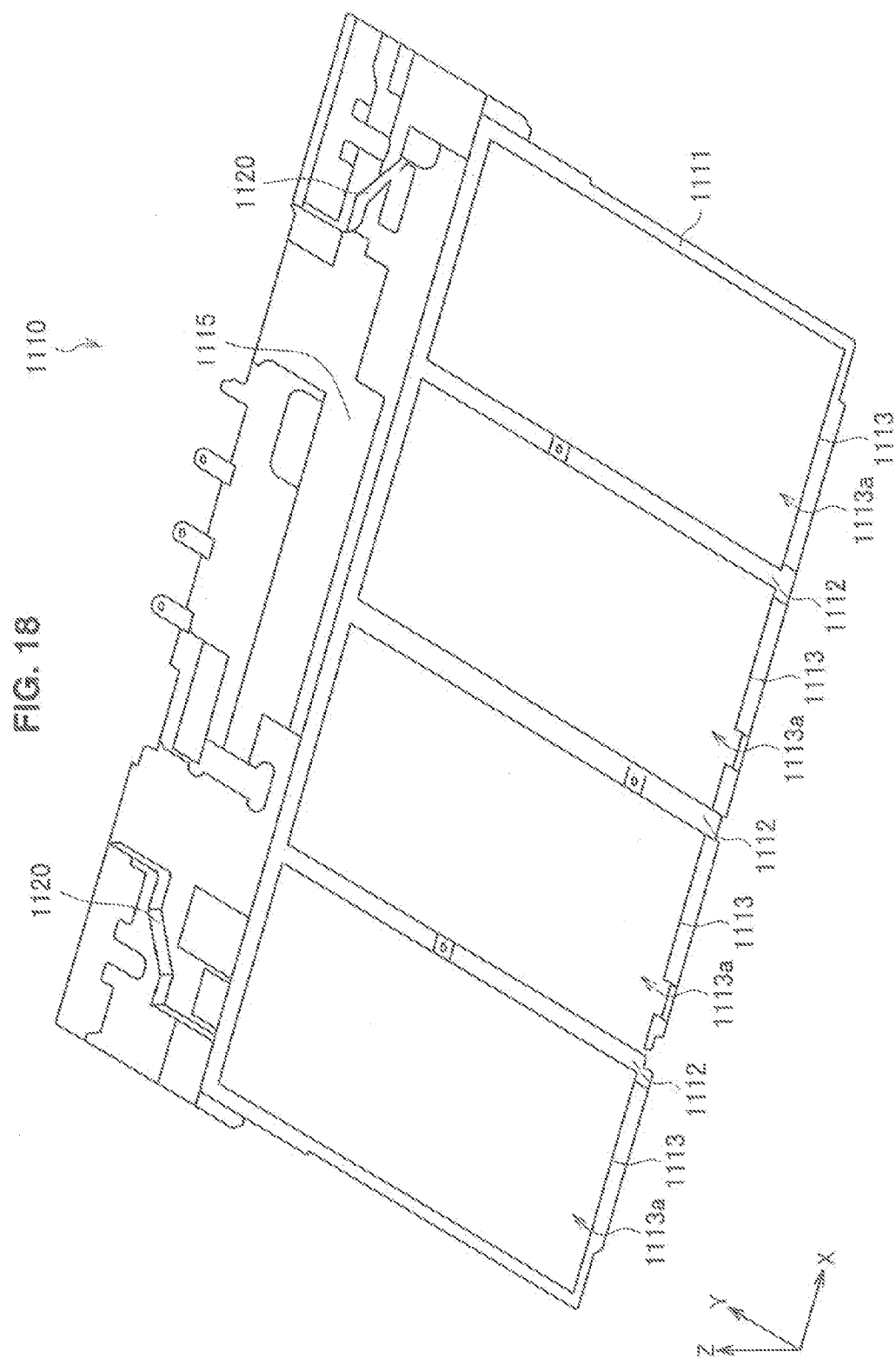
FIG. 18 is a perspective view for describing an example of the configuration of an internal frame 1110 according to the embodiment.
Figure 19:
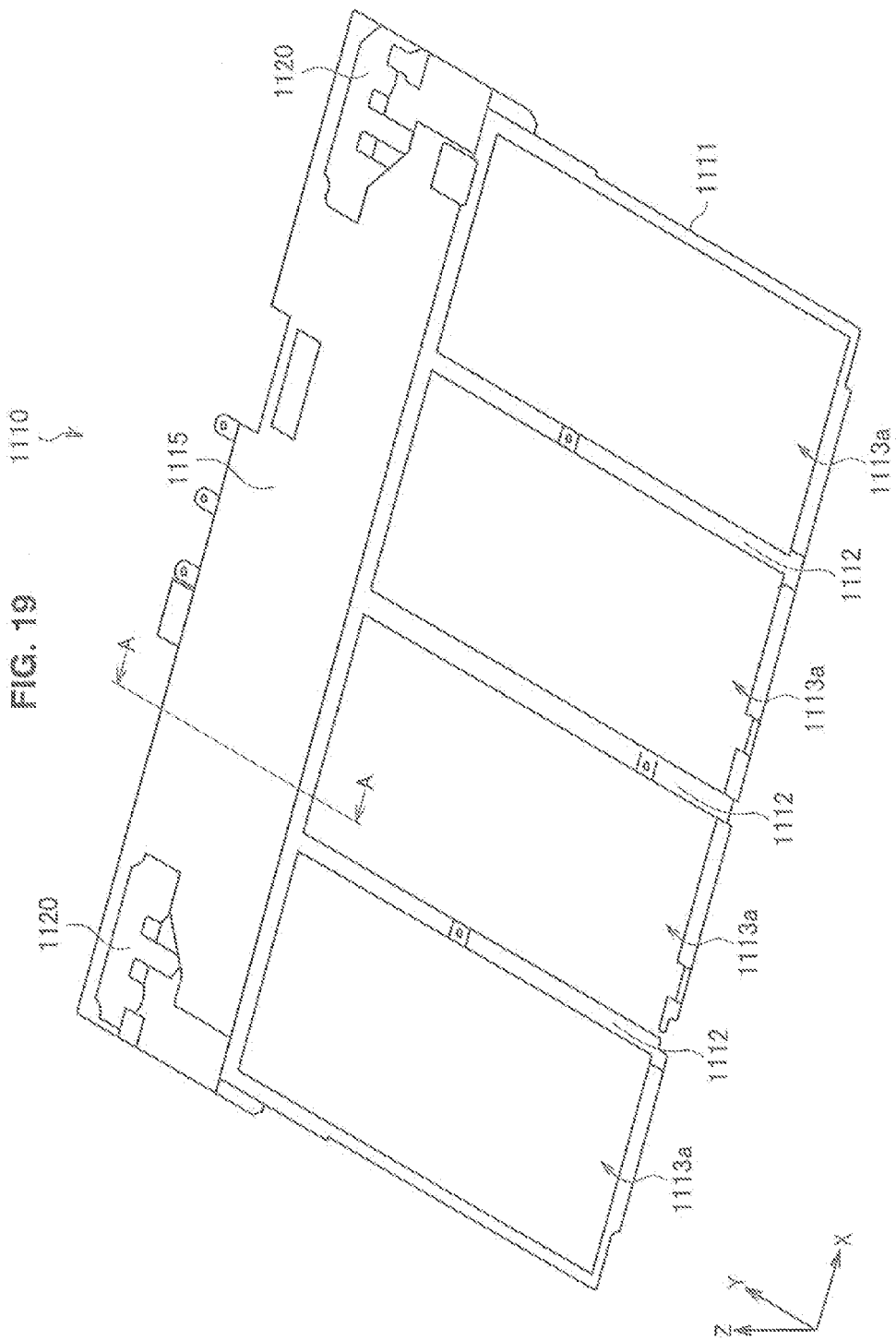
FIG. 19 is a perspective view for describing an example of the configuration of the internal frame 1110 from the back side of FIG. 18.
Figure 20:
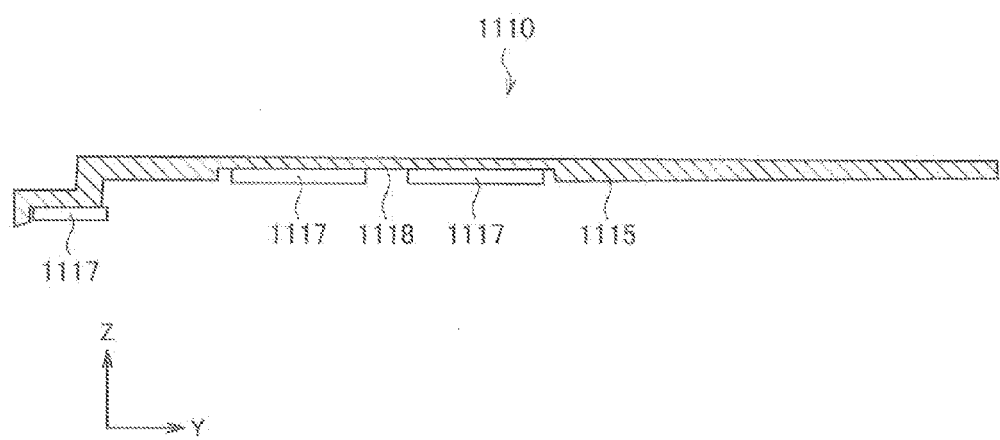
FIG. 20 is a sectional view taken along the line A-A of FIG. 19.

FIG. 18 is a perspective view for describing an example of the configuration of the internal frame 1110. FIG. 19 is a perspective view for describing an example of the configuration of the internal frame 1110 from the back side of FIG. 18. FIG. 20 is a sectional view taken along the line A-A of FIG. 19.

The internal frame 1110 has a predetermined thickness and has a rectangular shape. Here, the internal frame 1110 is assumed to be formed of aluminum. As illustrated in FIG. 18, the internal frame 1110 includes the first frame portion 1111 located on one end side in the lateral direction (the Y direction in FIG. 18) and a second frame portion 1115 located on the other end side in the lateral direction. The side of the second frame portion 1115 is connected to the hinge mechanism unit 40 illustrated in FIG. 1. In the embodiment, the lateral direction (the Y direction in FIG. 18) of the internal frame 1110 corresponds to a first direction and the longitudinal direction (the X direction in FIG. 18) of the internal frame 1110 corresponds to a second direction substantially orthogonal to the first direction.

(First Frame Portion 1111)

The first frame portion 1111 includes a plurality of opening portions 1113 formed to be partitioned by bars 1112, as illustrated in FIG. 18. Specifically, as the plurality of opening portions 1113, four opening portions are formed to be partitioned in the longitudinal direction of the frame. The four opening portions 1113 are surrounded by the bars 1112 formed in the perimeters thereof.

The bars 1112 are formed to have thicknesses thicker than portions other than the bars 1112 in the first frame portion 1111 and have a function of improving the rigidity of the first frame portion 1111. Therefore, even when the opening portions 1113 are formed in the first frame portion 1111, the rigidity of the first frame portion 1111 can be prevented from deteriorating by providing the bars 1112.

The four opening portions 1113 each include openings 1113a with rectangular shapes of the same size. Electronic components are disposed in the four openings 1113a. Thus, by disposing the electric components in the openings 1113a, the electronic components disposed on the internal frame 1110 can be reduced, and thus it is possible to thin the body-side casing 1300.

For example, as illustrated in FIG. 17, the cells 1142 of the battery modules 1140 are disposed in the four openings 1113a. Here, the size of the opening 1113a is substantially the same as the size of the cell 1142. In other words, the lengths in the longitudinal direction and the lateral direction of the frame of the opening 1113a are the same as the lengths in the longitudinal direction and the lateral direction of the frame of the cell 1142. Therefore, the opening 1113a is embedded in the cell 1142 without a gap and the battery module 1140 fitted in the first frame portion 1111 has a function of a strength component. Consequently, it is possible to improve the rigidity of the first frame portion 1111.

The thickness of the first frame portion 1111 is the same as the thickness of the battery module 1140 disposed in the opening portion 1113. Specifically, the thickness of the bar 1112 of the first frame portion 1111 is the same as the thickness of the battery module 1140. Thus, since the thickness of the body-side casing 1300 can be prevented from increasing due to the thickness of the battery module 1140, it is possible to thin the body-side casing 1300.

As described above, the cells 1142 of the battery modules 1140 are disposed in the four openings 1113a, but an embodiment of the disclosure is not limited thereto. For example, electric components (for example, speakers) other than the cells 1142 may be disposed in the openings 1113a.

As described above, the four openings 1113a have the rectangular shape, but an embodiment of the disclosure is not limited thereto. For example, the four openings 1113a may have a circular shape. As described above, the sizes of the four openings 1113a are set to be the same, but an embodiment of the disclosure is not limited thereto. The sizes of the openings 1113a may be different according to the sizes of electric components to be disposed.

(Second Frame Portion 1115)

The second frame portion 1115 is linked to the first frame portion 1111 in the longitudinal direction (the X direction in FIG. 18) of the frame. In the second frame portion 1115, adjacent regions of the four opening portions 1113 corresponding to the widths of the four opening portions 1113 in the longitudinal direction of the frame are formed in a continuous surface shape. That is, no opening is formed in the adjacent regions of the opening portions 1113 in the second frame portion 1115. The continuous surface of the second frame portion 1115 can also be defined as follows. That is, the second frame portion 1115 is adjacent to the first frame portion 1111 in the lateral direction of the frame and is formed in the continuous surface shape in the longitudinal direction of the frame.

Thus, by forming the adjacent regions of the four opening portions 1113 in the second frame portion 1115 in the continuous surface shape, the adjacent regions can be used as a portion that reinforces the rigidity of the opening portions 1113. Consequently, it is possible to prevent the rigidity in the opening portions 1113 from deteriorating.

In particular, in the embodiment, the width of the first frame portion 1111 (particularly, the width of the opening portion 1113) is larger than the width of the second frame portion 1115 in the lateral direction (the Y direction in FIG. 18) of the frame. In this case, as described above, when the second frame portion 1115 is formed on the continuous surface shape in the longitudinal direction of the frame in the adjacent regions of the four opening portions 1113, the second frame portion 1115 reinforces the rigidity. Therefore, it is possible to efficiently prevent the rigidity of the internal frame 1110 from deteriorating due to the opening portions 1113.

Various electric components are also disposed in the second frame portion 1115. The electric components are disposed in concave portions of the second frame portion 1115. Thus, since the electric components can be prevented from protruding from the second frame portion 1115, it is possible to prevent the body-side casing 1300 from being thickened.

For example, the substrate 1130 on which the electric components are mounted is fitted in the second frame portion 1115. A CPU 1131 which is an example of a heating element is installed in the substrate 1130. In the embodiment, a heat radiation pipe 1117 serving as a heat radiation member that radiates the heat generated by the CPU 1131 to the second frame portion 1115 is fitted in the second frame portion 1115. The heat radiation pipe 1117 comes into contact with the CPU 1131 and the second frame portion 1115. Thus, in the embodiment, the second frame portion 1115 also has a heat radiation function.

Here, as illustrated in FIG. 20, the second frame portion 1115 has a concave portion 1118 in which the heat radiation pipe 1117 is fitted and the concave portion 1118 is concaved by the thickness of the heat radiation pipe 1117. Therefore, the heat radiation pipe 1117 fitted in the second frame portion 1115 does not protrude from the second frame portion 1115. Therefore, even when the heat radiation pipe 1117 is installed, it is possible to prevent the body-side casing 1300 from being thickened. As illustrated in FIG. 20, the heat radiation pipe 1117 may be installed in a place other than the concave portion 1118.

In the embodiment, as illustrated in FIG. 18, the second frame portion 1115 has wall portions 1120 erected from the flat continuous surface. Here, the wall portions 1120 protrude in the Z direction from the continuous surface in the X and Y directions illustrated in FIG. 18. That is, the wall portions 1120 become rise walls that form a step difference with respect to the continuous surface. By installing such rise walls, the rigidity of the second frame portion 1115 is improved.

Here, the wall portions 1120 are formed to surround the end regions in the longitudinal direction of the second frame portion 1115. Specifically, as illustrated in FIG. 18, the wall portions 1120 are formed to surround regions with an inverted L shape at both ends in the longitudinal direction. By installing these wall portions 1120, it is possible to improve the rigidity of the end regions of the internal frame 1110.

Concave portions are formed in the back sides of the wall portions 1120 and electric components are disposed in the concave portions. Thus, the spaces formed by the wall portions 1120 formed as the rise walls can be efficiently utilized. The positions of the top faces of the wall portions 1120 are the same as the positions of the top faces of the electric components disposed in the concave portions 1116. Thus, it is possible to prevent the electric components from protruding from the second frame portion 1115 while improving the rigidity by the wall portions 1120.

As described above, electric components are disposed in the first frame portion 1111 and the second frame portion 1115, but the embodiment of the present disclosure is not limited thereto. For example, electric components may be disposed in first frame portion 1111 or the second frame portion 1115. Preferably, it is desirable to dispose electric components only in the first frame portion 1111. Thus, electric components may be disposed in at least one of the first frame portion 1111 and the second frame portion 1115.

In the internal frame 1110 serving as the above-described frame structure, the second frame portion 1115 is linked to the first frame portion 1111 in the longitudinal direction of the frame. In the second frame portion 1115, the adjacent regions of the plurality of opening portions 1113 corresponding to the widths of the plurality of opening portions 1113 in the longitudinal direction of the frame are formed in the continuous surface shape. Thus, by forming the adjacent regions of the plurality of opening portions 1113 in the second frame portion 1115 in the continuous surface shape, it is possible to use the adjacent regions as portions that reinforce the rigidity of the opening portions 1113. Consequently, it is possible to prevent the rigidity in the opening portions 1113 from deteriorating. When the cells 1142 are disposed in the openings 1113a of the opening portions 1113, the cells 1142 have a function of a strength component. Consequently, it is possible to improve the rigidity of the first frame portion 1111.

7. Configuration of Connector

As illustrated in FIG. 17, the connectors 1134 are mounted on the substrate 1130 installed in the internal frame 1110. An example of the configuration of the connectors 1134 according to the embodiment will be described with reference to FIGS. 21 to 23.

Figure 22A:
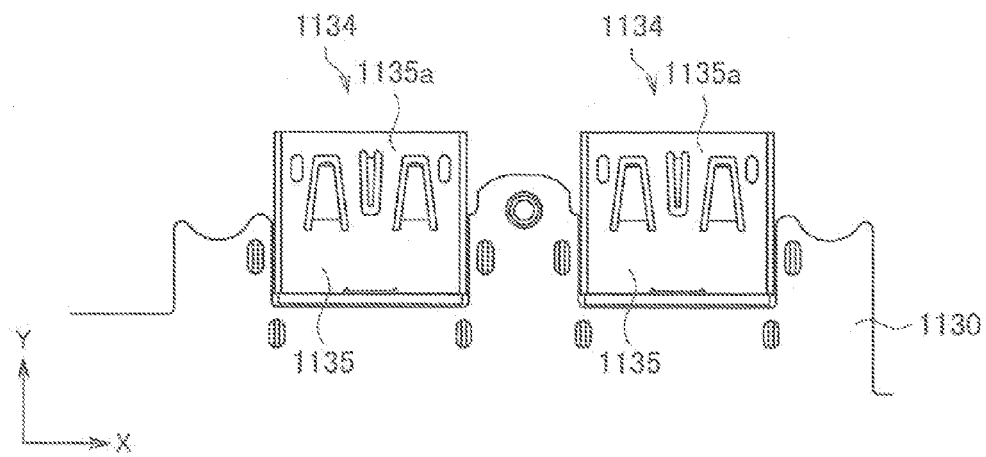
FIGS. 22A and 22B are plan views illustrating an example of a state in which the connectors 1134 are mounted on a substrate 1130 according to the embodiment.
Figure 22B:
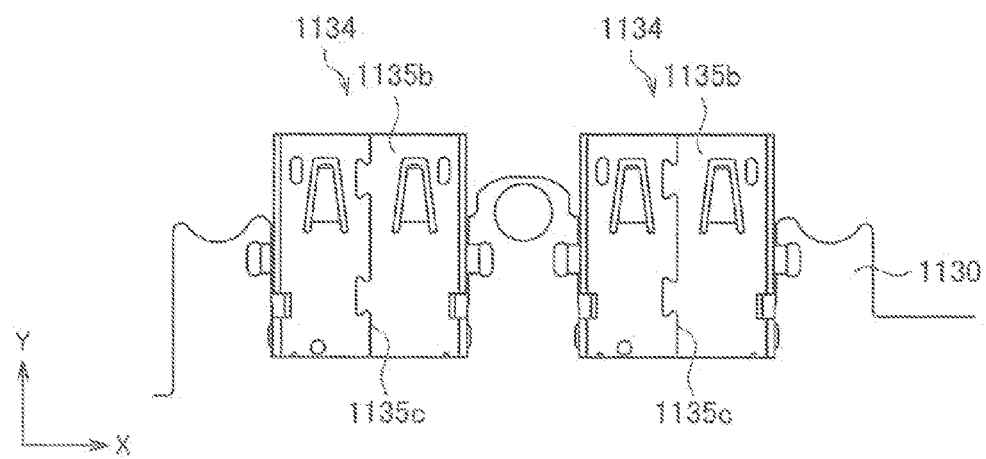
Figure 23:
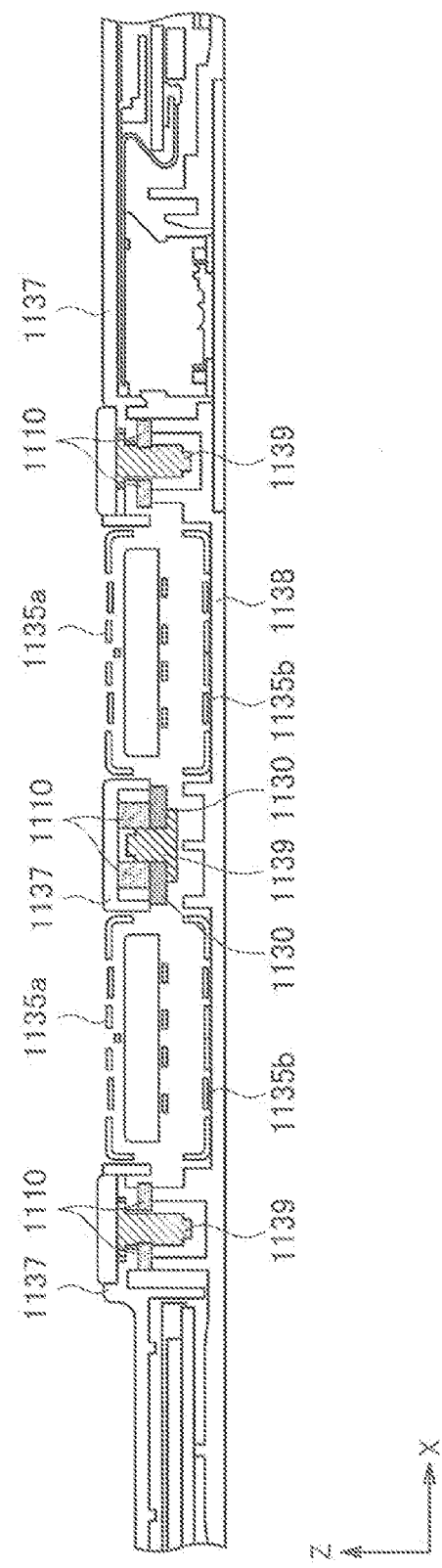
FIG. 23 is a sectional view illustrating an example of a fixed state of the connectors 1134.

FIG. 21 is a perspective view illustrating an attachment of the connector 1134. FIGS. 22A and 22B are plan views illustrating an example of a state in which the connectors 1134 are mounted on a substrate 1130. FIG. 23 is a sectional view illustrating an example of a fixed state of the connectors 1134. FIG. 22A is a diagram showing upper surfaces 1135a of shells 1135 of the connectors 1134. FIG. 22B is a diagram showing lower surfaces 1135b of the shells 1135.

Cables (for example, USB cables) are connected to the connectors 1134. Thus, the information processing device 110 can communicate with an external device via the cables. The connectors 1134 are fitted in notches of the end surfaces of the substrate 1130. The notches are notched in a U-shape and the connectors 1134 are fitted in the substrate 1130 to be embedded in the notches, as illustrated in FIGS. 22A and 22B.

The connector 1134 has the shell 1135 covering a connection terminal. In the embodiment, as illustrated in FIG. 21, the upper surface 1135a which is one surface of the shell 1135 is exposed to the outside. That is, the upper surface 1135a of the shell 1135 is not covered with an upper exterior member 1137. The upper surface 1135a is located at the same position as an upper appearance surface of the body-side casing 1300. Thus, by exposing the upper surfaces 1135a, it is possible to thin the thickness of the body-side casing 1300.

As illustrated in FIG. 22B, the connector 1134 includes a joining portion 1135c of the shell 1135 on the lower surface 1135b on the opposite side to the upper surface 1135a exposed to the outside of the shell 1135. Thus, by forming the joining portion 1135c on the lower surface 1135b of the shell 1135, when the cable connected to the connector 1134 is pried off, the joining portion 1135c can be prevented from being opened, as will be described below.

In general, a user connects a cable to the connector 1134 of the note-type personal computer placed on a desk or the like. In this case, it is easy for the user to pry the cable off upward. Therefore, when the joining portion of the shell 1135 is formed on the upper surface 1135a, there is a concern of the joining portion being opened by the cable that is pried off. In contrast, when the joining portion 1135c is formed on the lower surface 1135b of the shell 1135, the joining portion 1135c is located on the opposite side to the direction in which the cable is pried off. Thus, there is no concern of the joining portion 1135c being opened.

As illustrated in FIG. 22B, the connectors 1134 are fitted in the substrate 1130 on the side of the lower surfaces 1135b of the shells 1135. As illustrated in FIG. 23, the lower surface 1135b of the shell 1135 is covered with a lower exterior member 1138. Thus, by covering the lower surface 1135b with the lower exterior member 1138, it is possible to prevent the connector 1134 from coming off of the substrate 1130.

Both sides of the connectors 1134 are fixed by fastening members such as screws 1139, as illustrated in FIG. 23. Specifically, both sides of the two connectors 1134 are fastened by the screws 1139 at three sites. Here, the internal frame 1110 and the substrate 1130 are fastened at the central site among the three sites. The internal frame 1110 and the upper and lower exterior members 1137 and 1138 are fastened at the two right and left sites. By fixing both sides of the connectors 1134, it is possible to prevent the connectors 1134 from coming off of the substrate 1130 since the cables connected to the connectors 1134 are pried off or prevent the substrate 1130 from being broken.

As described above, the internal frame 1110 and the upper and lower exterior members 1137 and 1138 are fastened by the screws 1139 at the two right and left sites, but the embodiment of the present disclosure is not limited thereto. For example, the internal frame 1110 and the substrate 1130 may be fastened by the screws 1139 at the two right and left sites. In this case, the upper and lower exterior members 1137 and 1138 are preferably fixed at other sites.

8. Mounting of Battery Module in Internal Frame

An example in which the battery module 1140 is fitted in the internal frame 1110 will be described with reference to FIGS. 24 and 25.

Figure 24:
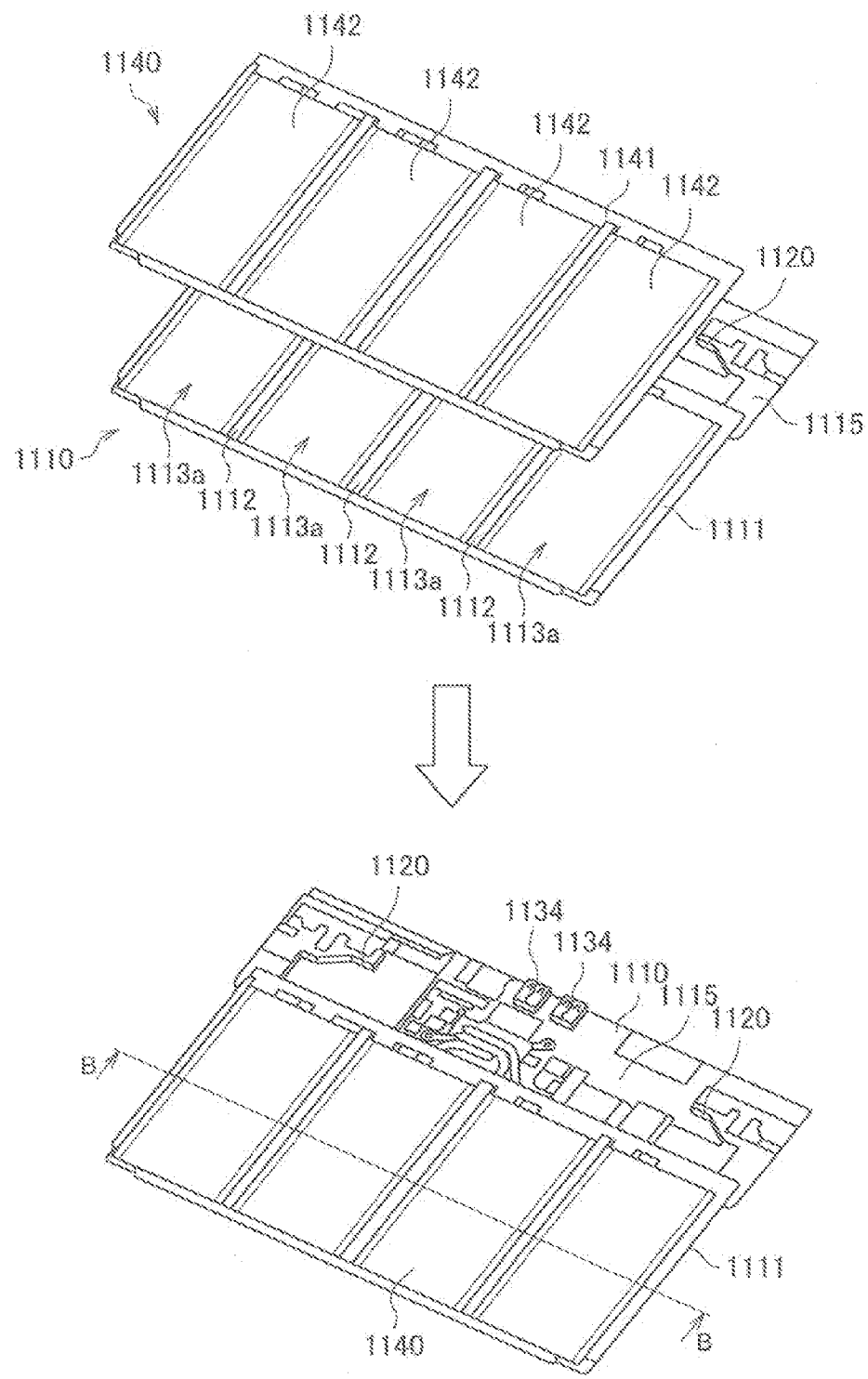
FIG. 24 is a perspective view for describing an example in which a battery module 1140 is fitted in the internal frame 1110.

FIG. 24 is a perspective view for describing an example in which a battery module 1140 is fitted in the internal frame 1110. FIG. 25 is a sectional view for describing the example in which the battery module 1140 is fitted in the internal frame 1110. FIG. 25 is a diagram corresponding to a part of the sectional view taken along the line B-B of FIG. 24.

In the body-side casing 1300 according to the embodiment, as illustrated in FIG. 24, the battery module 1140 in which the four cells 1142 are fixed to a plate 1141 is fitted to be fixed to the first frame portion 1111 of the internal frame 1110. Hereinafter, a specific flow of the fitting will be described.

First, a method of fixing the cells 1142 to the plate 1141 will be described. As illustrated in process 1 of FIG. 25, concave portions 1141a in which the cells 1142 are fitted are formed in the plate 1141. The cells 1142 are attached to the concave portions 1141a through, for example, an adhesive or a tape to be fixed. Thus, the battery module 1140 can be assembled.

Next, the assembled battery module 1140 is fitted in the first frame portion 1111 of the internal frame 1110. Specifically, as illustrated in process 2 of FIG. 25, the cells 1142 of the battery module 1140 are accommodated to be fitted in the openings 1113a of the opening portions 1113 of the first frame portion 1111. Thus, the four openings 1113a are embedded in the four cells 1142 without gaps. Here, as illustrated in FIG. 25, the battery module 1140 does not protrude from the first frame portion 1111 and is flat with the first frame portion 1111. Therefore, it is possible to fit the battery module 1140 without thickening the body-side casing 1300.

Figure 25:
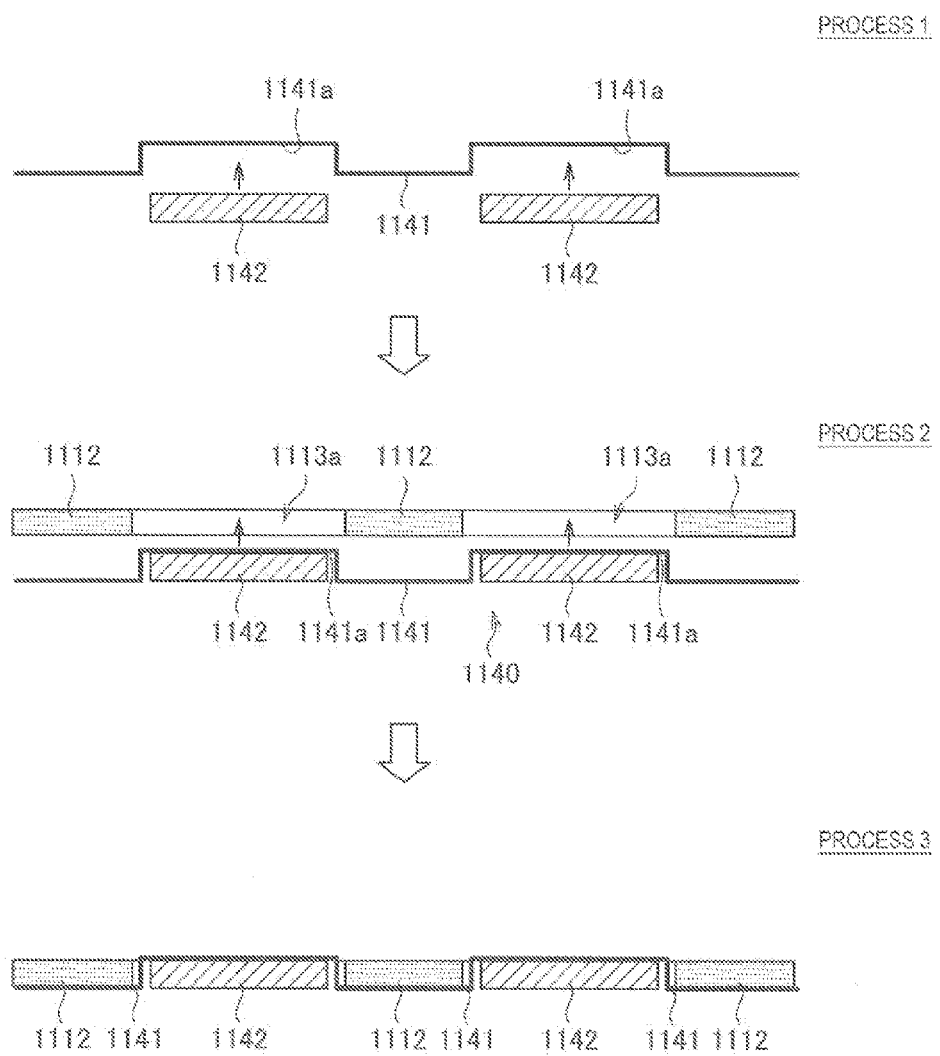
FIG. 25 is a sectional view for describing the example in which the battery module 1140 is fitted in the internal frame 1110.

Next, in process 3 of FIG. 25, the plate 1141 of the battery module 1140 and the first frame portion 1111 of the internal frame 1110 are fixed by screws or the like. Thus, the battery module 1140 is integrated with the internal frame 1110 to have a function of a strength component of the body-side casing 1300.

9. Conclusion

In the above-described information processing device 110, as illustrated in FIG. 18, the second frame portion 1115 of the internal frame 1110 is linked to the first frame portion 1111 in the longitudinal direction of the frame.

In the second frame portion 1115 the adjacent regions of the plurality of opening portions 1113 corresponding to the widths of the plurality of opening portions 1113 in the longitudinal direction of the frame are formed in the continuous surface shape. In other words, the second frame portion 1115 is adjacent to the first frame portion 1111 in the lateral direction of the frame and is formed in the continuous surface shape in the longitudinal direction of the frame.

Thus, by forming the adjacent regions of the plurality of opening portions 1113 in the second frame portion 1115 in the continuous surface shape, it is possible to use the adjacent regions as portions that reinforce the rigidity of the opening portions 1113. Consequently, it is possible to prevent the rigidity in the opening portions 1113 from deteriorating.

Electric components (the cells 1142 of the battery module 1140) having substantially the same size as the openings 1113a are disposed in the opening portions 1113. Therefore, the cells 1142 are embedded in the openings 1113a and the cells 1142 have the function of a strength component. Consequently, it is possible to improve the rigidity of the first frame portion 1111.

As illustrated in FIG. 18, the second frame portion 1115 has the wall portions 1120 erected from the flat continuous surface. Specifically, the wall portions 1120 are formed to surround the end regions in the longitudinal direction of the second frame portion 1115. By installing these wall portions 1120, it is possible to improve the rigidity of the end regions of the internal frame 1110.

As described above, the information processing device 110 is a note-type personal computer or a tablet terminal, but the embodiment of the present disclosure is not limited thereto. For example, the information processing device may be a portable device such as a game device, a mobile phone, or a smartphone.

10. Fourth Embodiment

An example of the external configuration of an information processing device according to an embodiment of the present disclosure will be described. Hereinafter, a note-type personal computer illustrated in FIG. 26 will be exemplified as the information processing device. An information processing device 2100 is not limited to the note-type personal computer, but may be, for example, an electronic device such as a tablet terminal.

Figure 26:
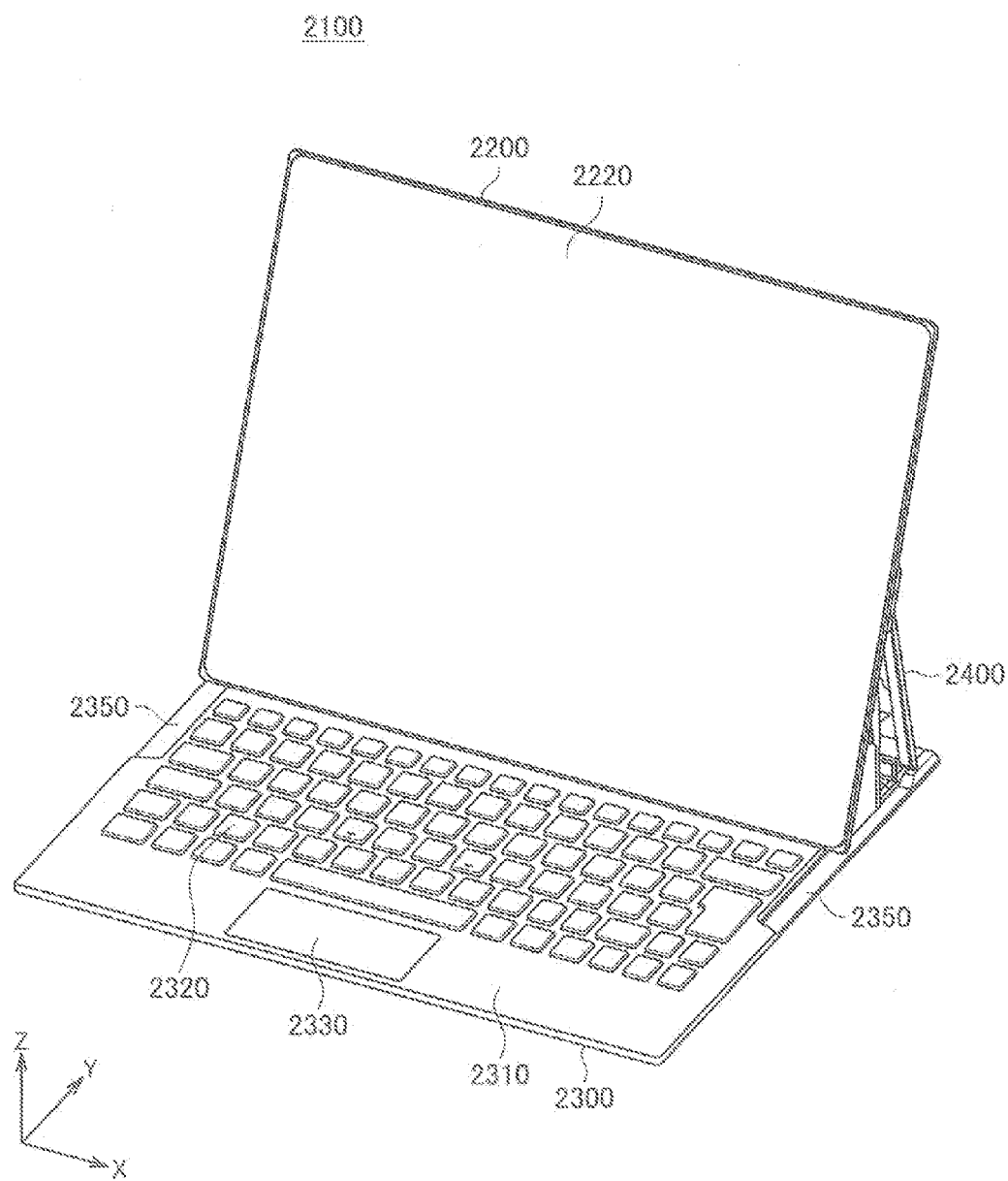
FIG. 26 is a perspective view illustrating an example of the external configuration of an information processing device 2100 according to an embodiment of the present disclosure.
Figure 27:
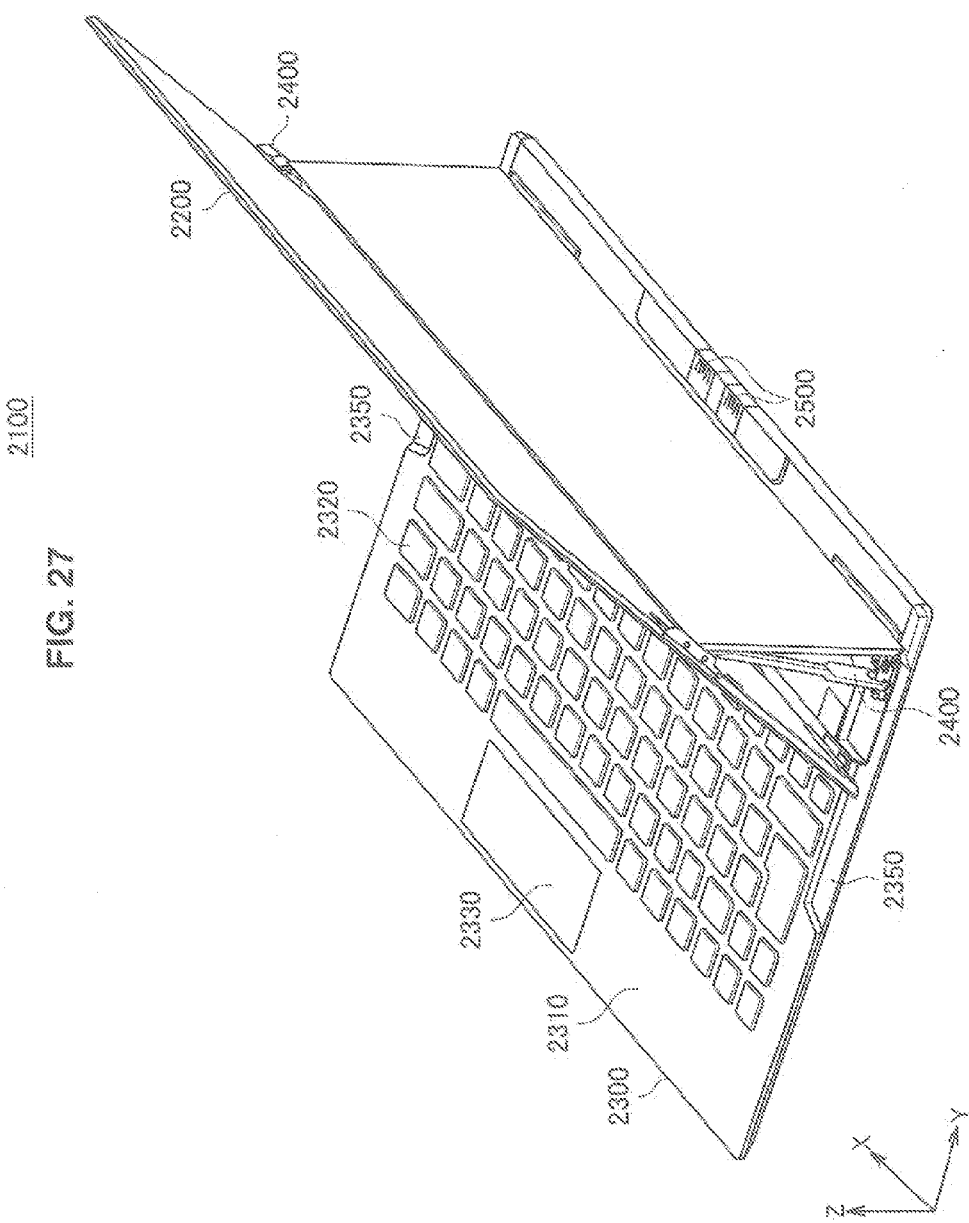
FIG. 27 is a perspective view illustrating the example of the external configuration of the information processing device 2100 according to the embodiment.
Figure 28:
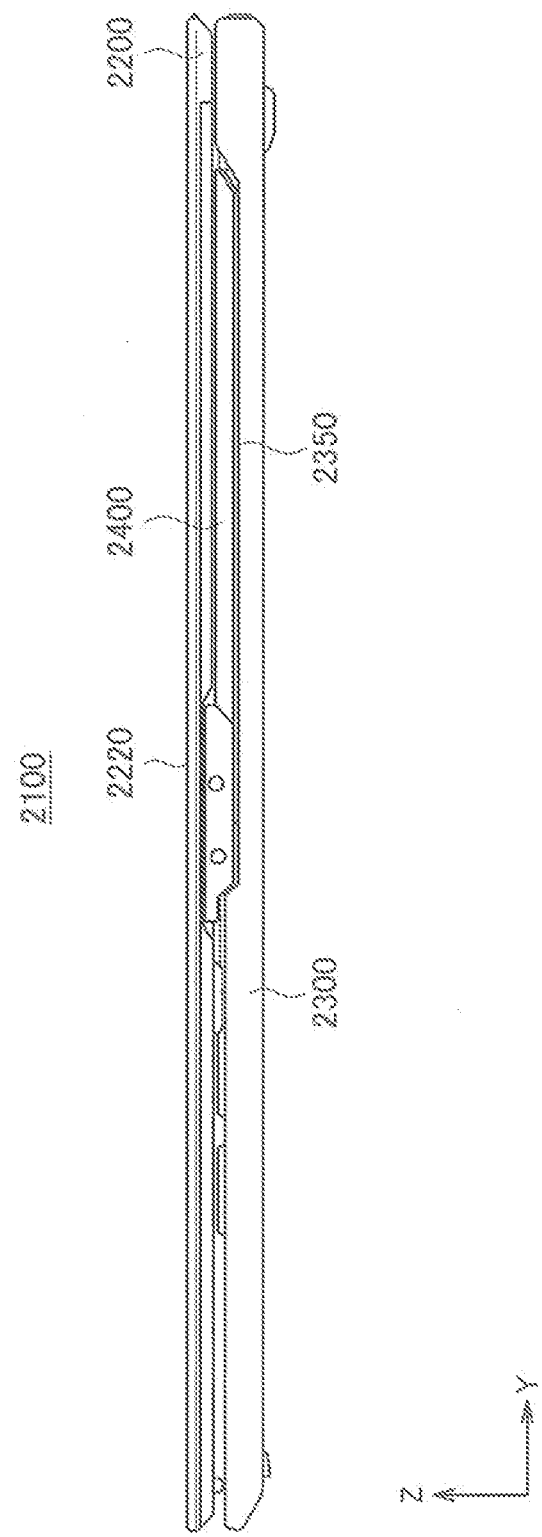
FIG. 28 is a side view illustrating the example of the external configuration of the information processing device 2100 according to the embodiment.

FIGS. 26 and 27 are perspective views illustrating an example of the external configuration of the information processing device 2100 according to the embodiment of the present disclosure. FIG. 28 is a side view illustrating the example of the external configuration of the information processing device 2100 according to the embodiment. FIGS. 26 and 27 illustrate an opened state of a display-side casing 2200 of the information processing device 2100 and FIG. 28 illustrates a closed state of the display-side casing 2200. FIG. 26 is a diagram showing the information processing device 2100 from the front side and FIG. 27 is a diagram showing the information processing device 2100 from the rear side.

As illustrated in FIGS. 26 to 28, the information processing device 2100 includes the display-side casing 2200, a body-side casing 2300, connection members 2400, and connectors 2500. For example, the display-side casing 2200 and the body-side casing 2300 are each formed in a flat plate shape and are formed to have the same size. In the embodiment, the body-side casing 2300 corresponds to a first casing and the display-side casing 2200 corresponds to a second casing.

The display-side casing 2200 includes a display unit 2220 that displays various kinds of information. The display unit 2220 is formed by, for example, a display device such as a liquid crystal display. A touch panel on which a user can perform a touch manipulation is superimposed on the display unit 2220. In the display-side casing 2200, a circuit substrate, a communication antenna, and the like are disposed in the periphery of the display unit 2220.

The body-side casing 2300 includes an input unit that receives an input manipulation from the user. Here, as the input unit, a keyboard 2320 and a touch pad 2330 are installed in input regions of the central site of a manipulation surface 2310 of the body-side casing 2300. Inside the body-side casing 2300, for example, a circuit substrate on which a circuit chip such as a central processing unit (CPU) controlling an operation of the information processing device 2100 is mounted is installed.

The connection members 2400 connect the display-side casing 2200 to the body-side casing 2300 so that the display-side casing 2200 can be slid. The pair of connection members 2400 are installed on both sides in the longitudinal direction (the X direction illustrated in FIG. 26) of the body-side casing 2300. The display-side casing 2200 can be slid between an opened state (see FIG. 26) with respect to the body-side casing 2300 and a closed state (see FIG. 28) with respect to the body-side casing 2300 by the pair of connection members 2400.

In the embodiment, reception concave portions 2350 receiving the connection members 2400 are formed in the manipulation surface 2310 of the body-side casing 2300 when the display-side casing 2200 enters the closed state. Thus, as will be described in detail, it is possible to realize thinness while preventing an increase in the size of the information processing device 2100 in which the body-side casing 2300 and the display-side casing 2200 are connected by the connection members 2400.

The display unit 2220 of the display-side casing 2200 is exposed to the outside not only in the opened state but also in the closed state of the display-side casing 2200. That is, the display unit 2220 is located on the opposite side to the side facing the body-side casing 2300 when the display-side casing 2200 is slid to overlap the body-side casing 2300. As described above, since the touch panel is superimposed on the display unit 2220, the information processing device 2100 can be used as a so-called tablet terminal in the closed state of the display-side casing 2200.

Cables (for example, USB cables) are connected to the connectors 2500. Thus, the information processing device 2100 can communicate with an external device via the cables. The connectors 2500 are fitted to a circuit substrate mounted inside the body-side casing 2300. The connectors 2500 are mounted on one end side (the rear surface of the body-side casing 2300) in the lateral direction of the body-side casing 2300, as illustrated in FIG. 27.

Communication between the display-side casing 2200 and the body-side casing 2300 described above is performed via a cable or a flexible circuit substrate (not illustrated). In this case, cables are disposed inside, for example, the connection members 2400. However, the embodiment of the present disclosure is not limited. The display-side casing 2200 and the body-side casing 2300 may communicate using, for example, short range wireless communication.

11. Detailed Configuration of Connection Member 2400 and Reception Concave Portion 2350

The detailed configurations of the connection members 2400 and the reception concave portions 2350 of the body-side casing 2300 according to the embodiment will be described with reference to FIGS. 29 to 32.

Figure 29:
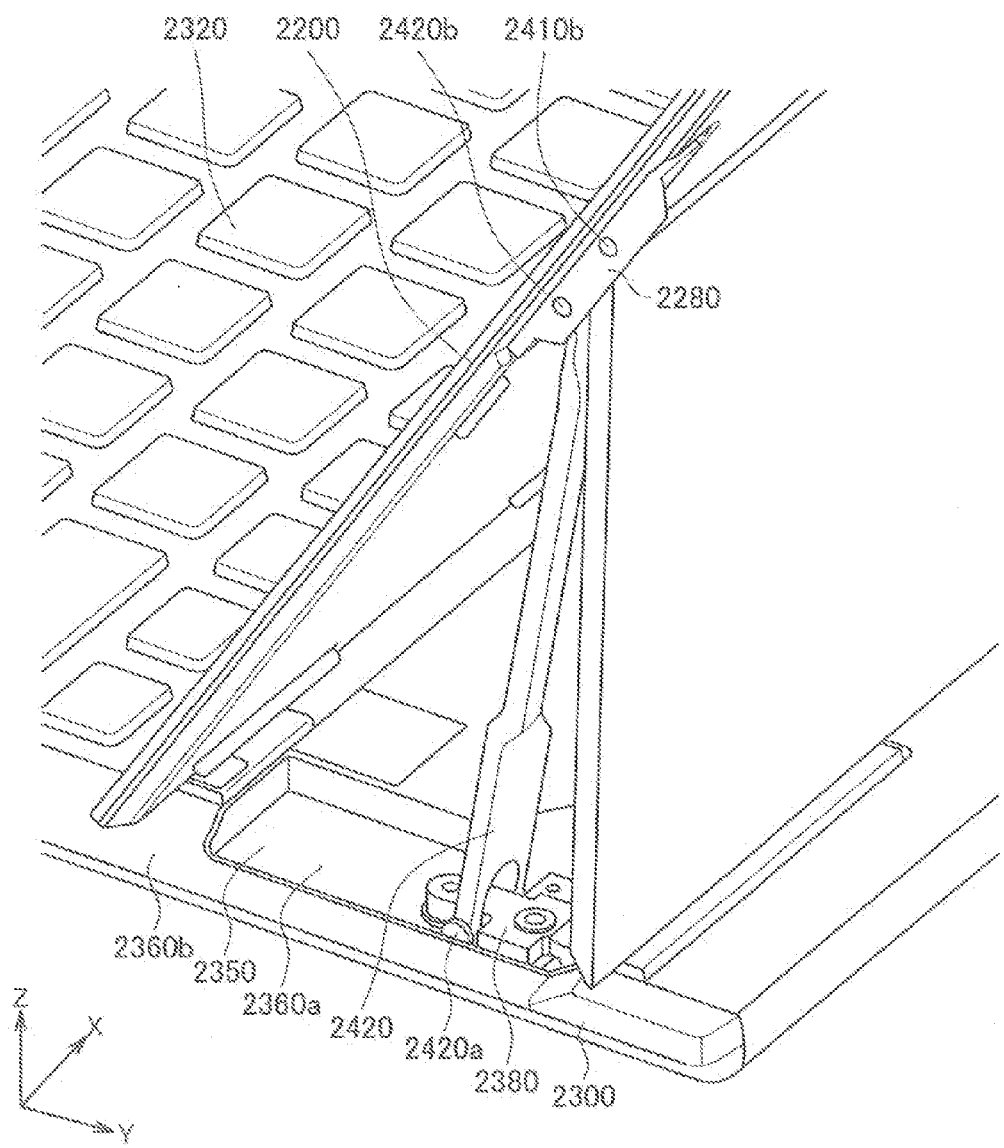
FIG. 29 is a perspective view illustrating an example of the configuration of a connection member 2400 and a reception concave portion 2350 according to the embodiment.
Figure 30:
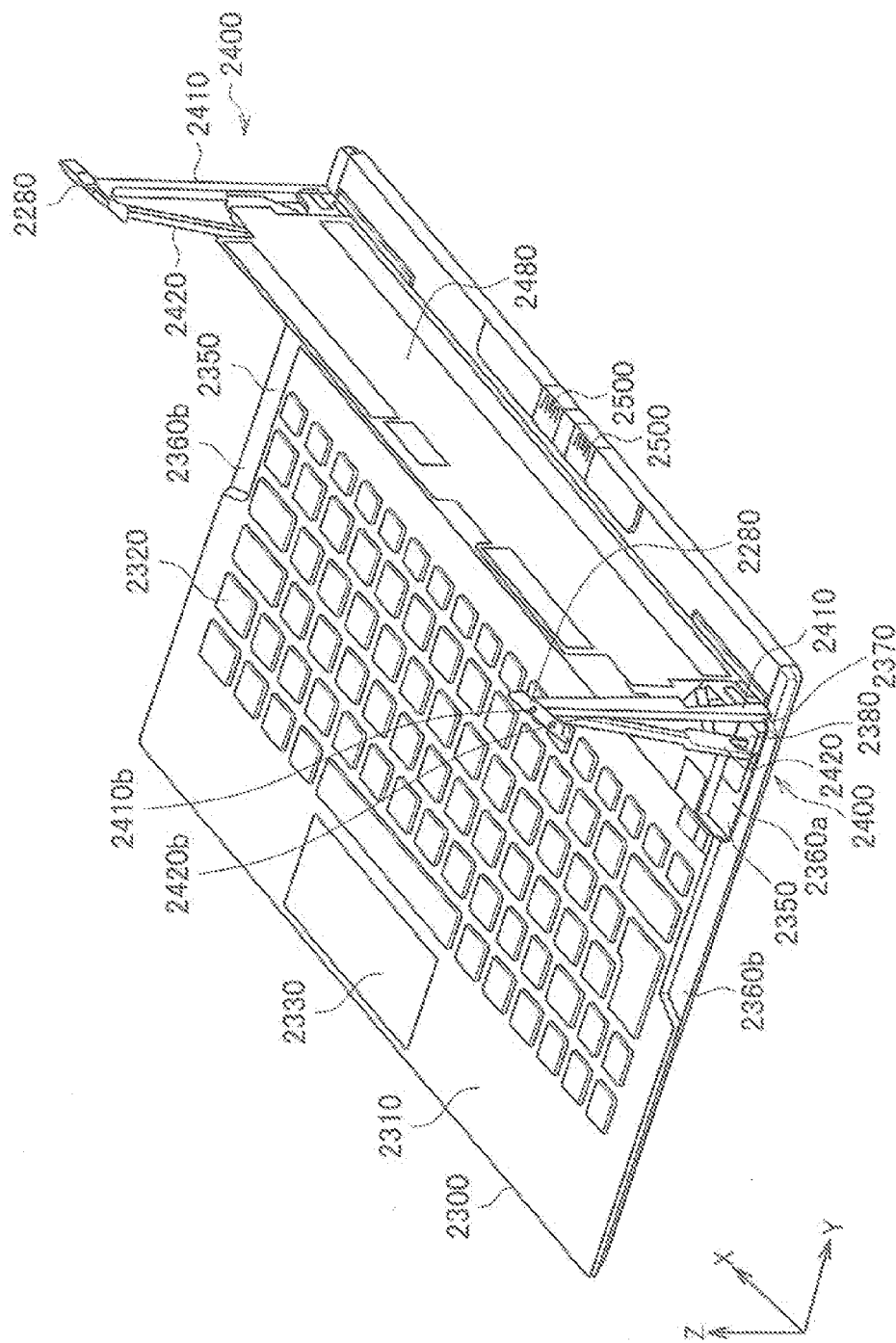
FIG. 30 is a perspective view illustrating the connection member 2400 and the reception concave portion 2350 when a display-side casing 2200 is in an opened state.
Figure 31:
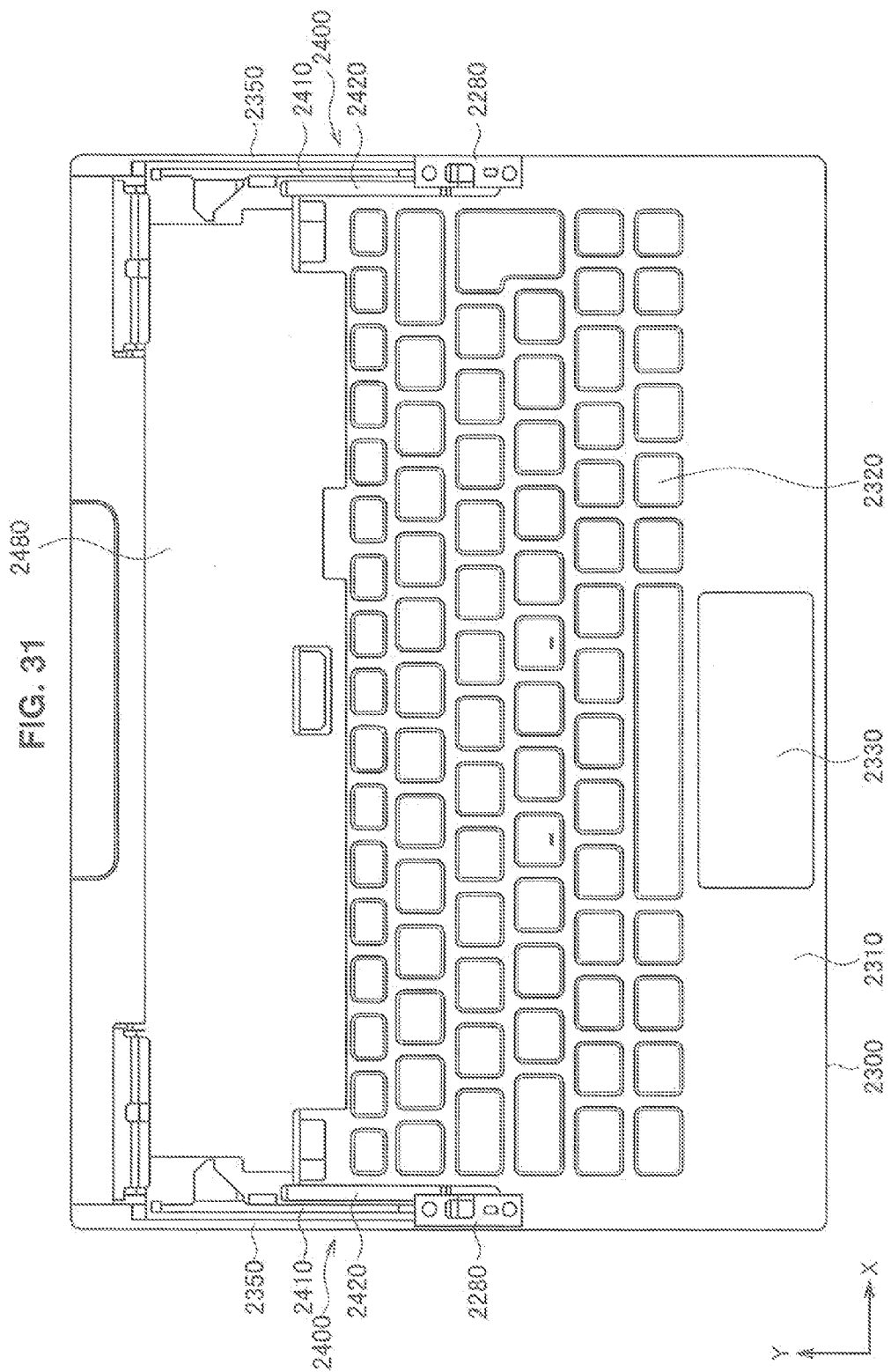
FIG. 31 is a plan view illustrating the connection member 2400 and the reception concave portion 2350 when the display-side casing 2200 is in a closed state.
Figure 32:
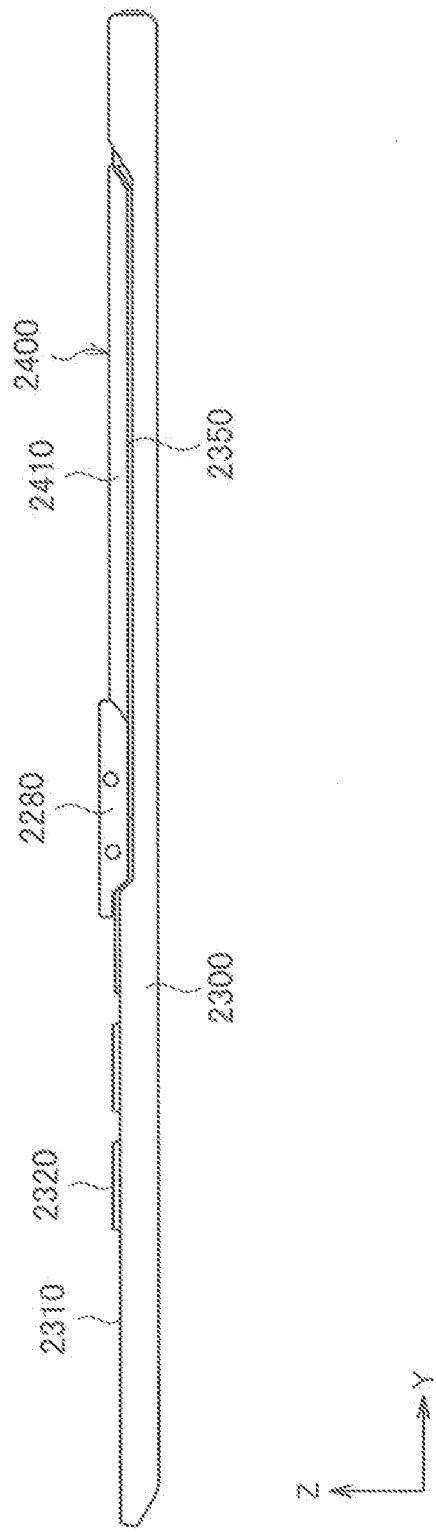
FIG. 32 is a side view illustrating the connection member 2400 and the reception concave portion 2350 when the display-side casing 2200 is in the closed state.

FIG. 29 is a perspective view illustrating an example of the configuration of the connection member 2400 and the reception concave portion 2350 according to the embodiment. FIG. 30 is a perspective view illustrating the connection member 2400 and the reception concave portion 2350 when the display-side casing 2200 is in the opened state. FIG. 31 is a plan view illustrating the connection member 2400 and the reception concave portion 2350 when the display-side casing 2200 is the closed state. FIG. 32 is a side view illustrating the connection member 2400 and the reception concave portion 2350 when the display-side casing 2200 is in the closed state. In FIGS. 30 to 32, the display-side casing 2200 is omitted to facilitate the description.

(Connection Member 2400)

As illustrated in FIG. 30, a pair of connection members 2400 are installed on both sides in the longitudinal direction (the X direction) of the body-side casing 2300 and on end side in the lateral direction (the Y direction). The pair of connection members 2400 have the same configuration. As illustrated in FIG. 30, a support plate 2480 is connected between the pair of connection members 2400. The support plate 2480 supports the connection members 2400 so that the pair of connection members 2400 move in conjunction.

The connection members 2400 are connected to the body-side casing 2300 and the display-side casing 2200 and have a function of sliding the display-side casing 2200 with respect to the body-side casing 2300. Each of the connection members 2400 has a 4-section link structure and includes a first arm 2410 and a second arm 2420. An embodiment of the present disclosure is not limited to the 4-section link structure. For example, each of the connection members 2400 may have only one arm.

The first arm 2410 and the second arm 2420 are formed of, for example, a metal to ensure strength. As illustrated in FIG. 31, the first arm 2410 is located on the outside in the longitudinal direction of the body-side casing 2300 and the second arm 2420 is located on the inside in the longitudinal direction of the body-side casing 2300. That is, the first arm 2410 and the second arm 2420 do not overlap in the longitudinal direction.

The first arm 2410 is formed in a rod shape and is connected to the body-side casing 2300 and the display-side casing 2200 to be rotatable. The first arm 2410 is supported by a fixed component 2370 (see FIG. 30) of the body-side casing 2300 via a shaft 2410a to be rotatable and is supported by a fixed component 2280 (see FIG. 29) of the display-side casing 2200 via a shaft 2410b to be rotatable.

The second arm 2420 is formed in a rod shape and is connected to the body-side casing 2300 and the display-side casing 2200 to be rotatable. The second arm 2420 is supported by a fixed component 2380 (see FIG. 29) of the body-side casing 2300 via a shaft 2420a to be rotatable and is supported by the fixed component 2280 of the display-side casing 2200 via a shaft 2420b to be rotatable.

The first arm 2410 and the second arm 2420 are rotated when the user slides the display-side casing 2200. When the display-side casing 2200 is slid to overlap the body-side casing 2300 (that is, in the closed state), the first arm 2410 and the second arm 2420 are received in the reception concave portion 2350, as illustrated in FIG. 31.

When the display-side casing 2200 is slid to overlap the body-side casing 2300, the first arm 2410 and the second arm 2420 are located over the input region of the manipulation surface 2310 from one end side in the lateral direction of the body-side casing 2300. Specifically, as illustrated in FIG. 31, the first arms 2410 and the second arms 2420 are located on the sides of the keyboard 2320. When the display-side casing 2200 is located in the closed state, the fixed component 2280 supporting the first arm 2410 and the second arm 2420 is located in the middle in the lateral direction of the body-side casing 2300, as illustrated in FIG. 31.

(Reception Concave Portion 2350)

As illustrated in FIG. 29, the reception concave portion 2350 is formed in a concave shape in the manipulation surface 2310 of the body-side casing 2300 facing the display-side casing 2200 in the closed state. When the display-side casing 2200 is slid to overlap the body-side casing 2300, the connection member 2400 is received in the reception concave portion 2350.

As illustrated in FIG. 30, the reception concave portions 2350 are formed on both ends in the longitudinal direction of the body-side casing 2300. The two reception concave portions 2350 are each formed in the lateral direction of the body-side casing 2300 and are formed in a symmetric shape. The reception concave portion 2350 has a size in which the first arm 2410 and the second arm 2420 of the connection member 2400 can be received.

Specifically, the reception concave portion 2350 includes a first concave portion 2360a in which one end side of the first arm 2410 is received and a second concave portion 2360b in which the other end side of the first arm 2410 and the second arm 2420 are received. As illustrated in FIG. 30, the first concave portion 2360a is located on the inside in the longitudinal direction of the body-side casing 2300 and the second concave portion 2360b is located on the outside in the longitudinal direction.

The first concave portion 2360a is located on the rear surface side of the keyboard 2320 in the lateral direction of the manipulation surface 2310 and the second concave portion 2360b is located to overlap a part of the keyboard 2320 in the lateral direction.

As illustrated in FIG. 31, when the display-side casing 2200 is in the closed state, the first arm 2410 and the second arm 2420 do not overlap in the thickness direction of the body-side casing 2300. Therefore, since it is not necessary to form the reception concave portion 2350 deeply, it is possible to form the reception concave portion 2350 in the manipulation surface 2310 in spite of the fact that the body-side casing 2300 is thinned.

As described above, the connectors 2500 are located toward one end side (rear surface side) in the lateral direction of the body-side casing 2300 with respect to the connection members 2400. A switch, a DC jack, and the like in addition to the connectors are installed on the rear surface of the body-side casing 2300. Thus, the switch and the connectors may not be disposed on both side surfaces of the body-side casing 2300. As a result, it is easy to dispose the reception concave portions 2350 in the body-side casing 2300.

12. Opened-State Holding Member of Display-Side Casing 2200

A holding mechanism 2700 holding the opened state of the display-side casing 2200 will be described with reference to FIGS. 33 to 35.

Figure 33:
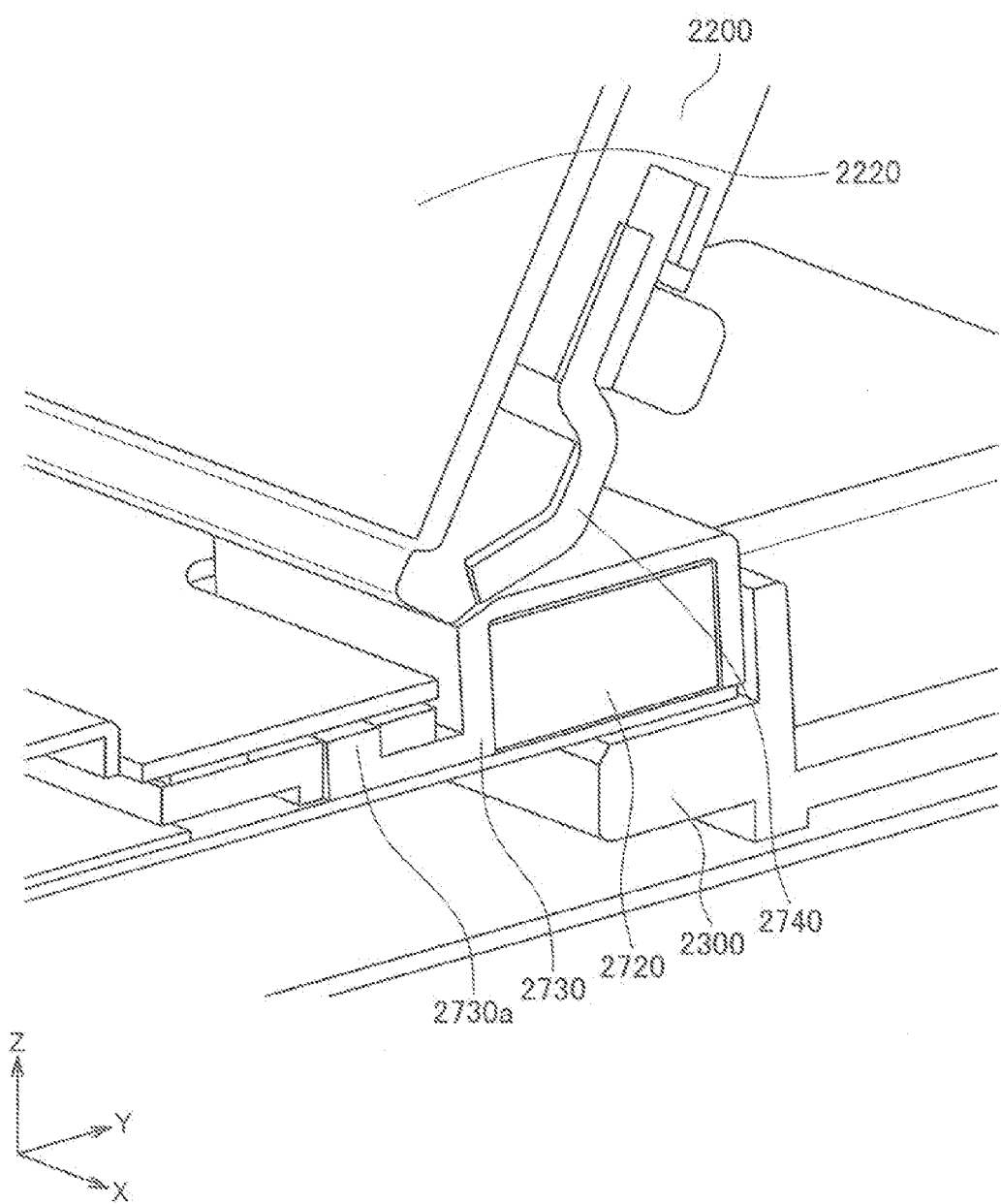
FIG. 33 is a perspective view illustrating an example of the configuration of a holding mechanism 2700 according to the embodiment.
Figure 34:
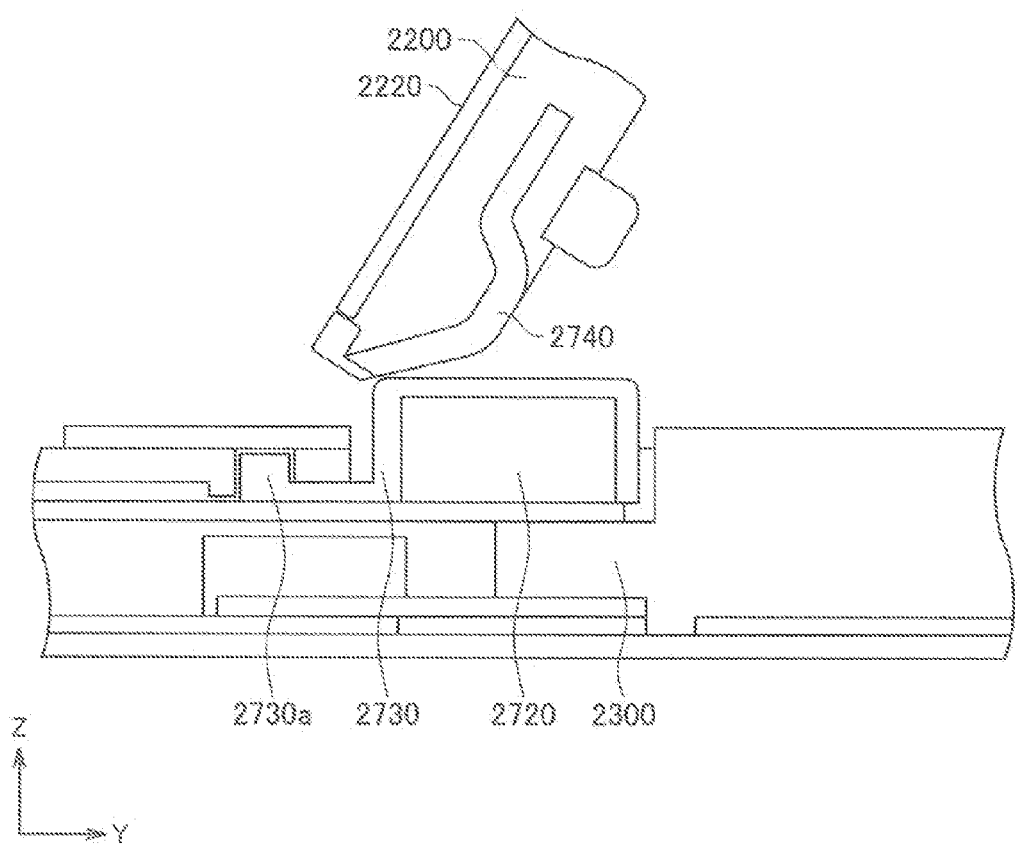
FIG. 34 is a side view illustrating an example of the configuration of the holding mechanism 2700.

FIG. 33 is a perspective view illustrating an example of the configuration of the holding mechanism 2700 according to the embodiment. FIG. 34 is a side view illustrating an example of the configuration of the holding mechanism 2700. FIG. 35 is a side view illustrating an example of a state in which a magnet 2720 of the holding mechanism 2700 holds the display-side casing 2200. FIG. 34 illustrates a separate position of the magnet 2720 and FIG. 35 illustrates a contact position of the magnet 2720.

A pair of the holding mechanisms 2700 are installed in both ends in the longitudinal direction (the X direction in FIG. 26) of the information processing device 2100. Each of the pair of holding mechanisms 2700 has the same configuration. Therefore, the configuration of one holding mechanism 2700 will be exemplified herein. As illustrated in FIG. 33, the holding mechanism 2700 includes the magnet 2720 which is an example of a holding member, a cover member 2730, and a metal plate 2740 which is an example of a metal member.

Figure 35:
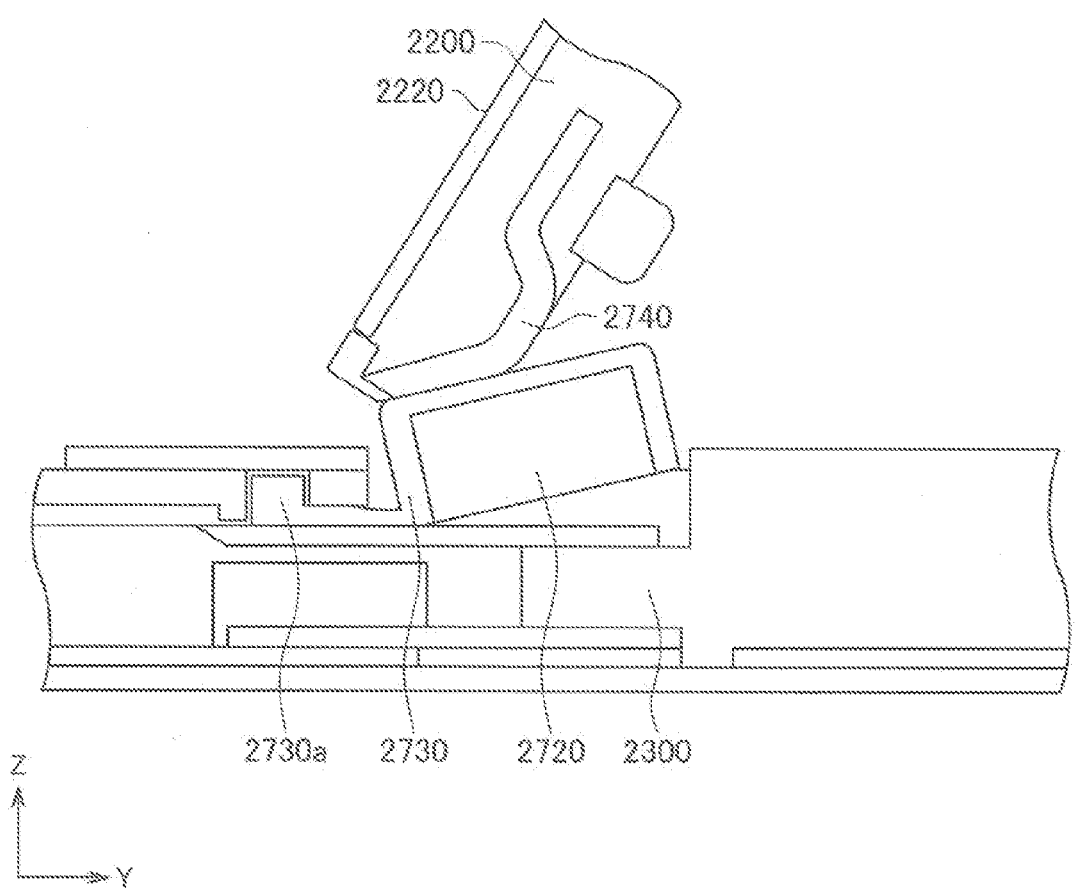
FIG. 35 is a side view illustrating an example of a state in which a magnet 2720 of the holding mechanism 2700 holds the display-side casing 2200.

As illustrated in FIG. 35, the magnet 2720 comes into contact with the rear surface side of the display-side casing 2200 located in the opened state and holds the opened state of the display-side casing 2200. The magnet 2720 can be moved between a separate position (see FIG. 34) at which the magnet 2720 is separated from the display-side casing 2200 and a contact position (see FIG. 35) at which the magnet 2720 comes into contact with the display-side casing 2200. When the display-side casing 2200 is located in the opened state, the magnet 2720 is moved from the separate position to the contact position and holds the opened state of the display-side casing 2200.

The magnet 2720 is covered with the cover member 2730. The cover member 2730 is molded of, for example, a resin such as an elastomer. One end 2730*a* of the cover member 2730 is held by the body-side casing 2300 (specifically, the palm rest), as illustrated in FIG. 33. When the magnet 2720 is moved from the separate position to the contact position, the cover member 2730 is transformed to a state in which the one end 2730*a* is held, as illustrated in FIG. 35. The magnet 2720 comes into contact with the display-side casing 2200 with the cover member 2730 interposed therebetween to hold the opened state.

The metal plate 2740 is installed on the rear surface side of the display-side casing 2200 with which the magnet 2720 located at the contact position comes into contact. The metal plate 2740 is installed on one end side in the lateral direction (the Y direction illustrated in FIG. 28) of the display-side casing 2200. The metal plate 2740 is closest to the magnet 2720 when the display-side casing 2200 is located in the opened state. Therefore, when the display-side casing 2200 is located in the opened state, the magnet 2720 is adsorbed to the metal plate 2740 by a magnetic force generated between the magnet 2720 and the metal plate 2740 to be located at the contact position. When the display-side casing 2200 is moved from the opened state to the closed state, the metal plate 2740 moves away from the magnet 2720. Therefore, the magnet 2720 is moved from the contact position to the separate position by the force of gravity.

In the above-described holding mechanism 2700, even when no dedicated mechanism is installed to move the magnet 2720, it is possible to easily move the magnet 2720 from the separate position to the contact position. As a result, it is possible to appropriately hold the opened state of the display-side casing 2200.

Here, the efficacy of the above-described holding mechanism 2700 will be described with reference to FIG. 36, in contrast with a hook structure according to a comparative example.

Figure 36:
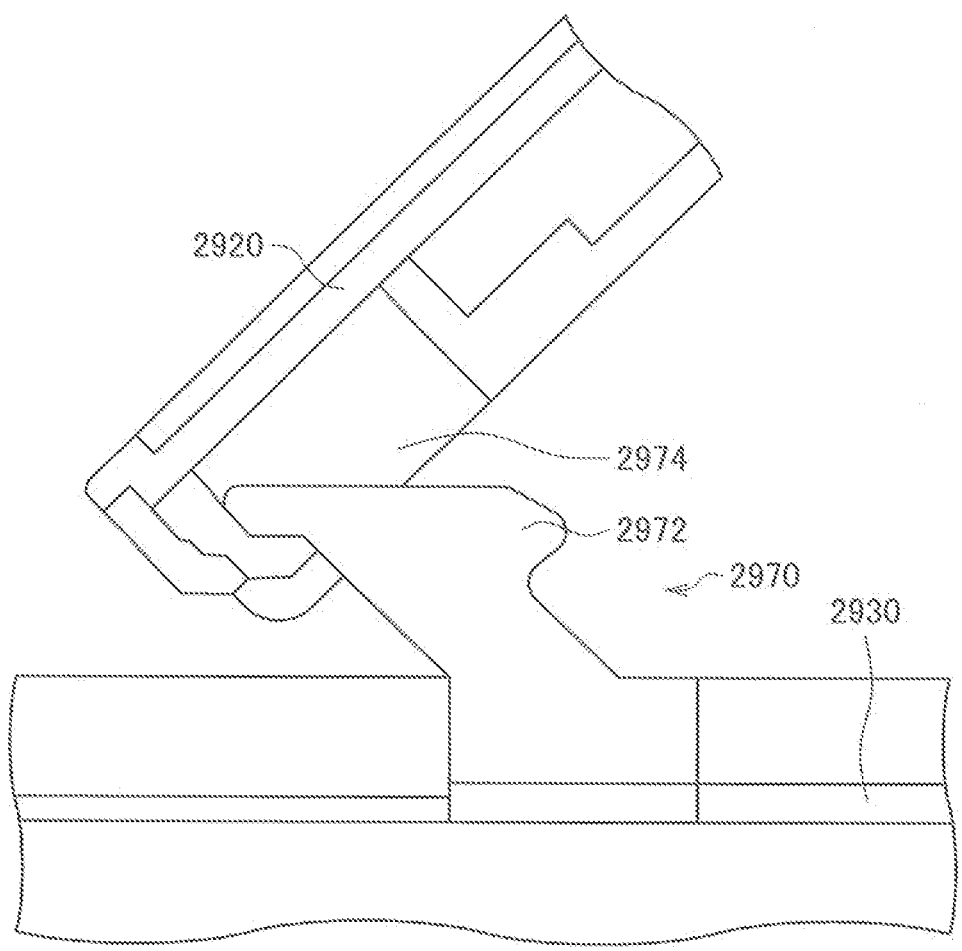
FIG. 36 is a schematic diagram for describing a hook structure 2970 according to a comparative example.

FIG. 36 is a schematic diagram for describing a hook structure 2970 according to a comparative example. In the hook structure 2970, when a hook 2972 protruding from a body-side casing 2930 is locked in a locking concave portion 2974 formed on the rear surface side of a display-side casing 2920, an opened state of the display-side casing 2920 is held. However, in the case of the hook structure 2970 illustrated in FIG. 36, it is difficult to realize thinness since the thickness of the device increases to ensure the height of the hook 2972.

In contrast, in the holding mechanism 2700 according to the embodiment, the magnet 2720 does not protrude from the body-side casing 2300 when the magnet 2720 is located at the separate position. Therefore, it is not necessary to increase the thickness of the device. Therefore, it is possible to thin the information processing device 2100. As described above, the cover member 2730 covering the magnet 2720 is installed, but the embodiment of the present disclosure is not limited thereto. For example, the cover member 2730 may not be installed.

13. Configuration of Periphery of Display Unit 2220 of Display-Side Casing 2200

A configuration of the periphery of the display unit 2220 in the display-side casing 2200 according to the embodiment will be described with reference to FIG. 37.

Figure 37:
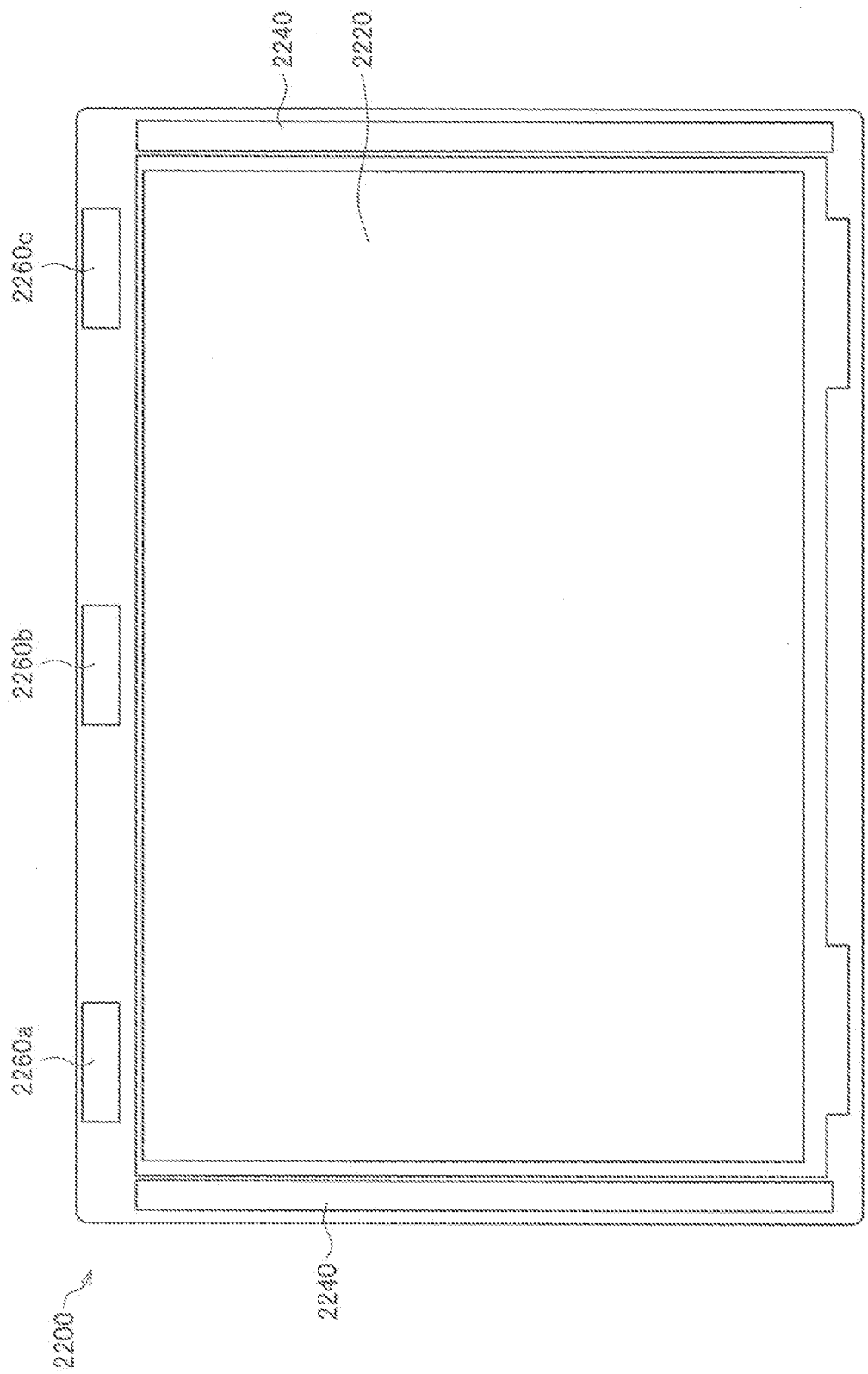
FIG. 37 is a schematic diagram illustrating an example of the internal configuration of the display-side casing 2200 according to an embodiment.

FIG. 37 is a schematic diagram illustrating an example of the internal configuration of the display-side casing 2200 according to the embodiment. As illustrated in FIG. 37, the display-side casing 2200 includes the display unit 2220, circuit substrates 2240, and antennas 2260*a*, 2260*b*, and 2260*c*.

The display unit 2220 is configured by a liquid crystal display herein. As illustrated in FIG. 37, a space is formed in the periphery of the display unit 2220 in the display-side casing 2200. The circuit substrates 2240 and the antennas 2260*a*, 2260*b*, and 2260*c* are disposed in the space. When the space is narrowed, an area occupied by the display unit 2220 in the display-side casing 2200 increases.

The circuit substrates 2240 are disposed on both sides of the display unit 2220 in the longitudinal direction of the display-side casing 2200. A CPU and the like controlling display of the display unit 2220 and communication by the antennas 2260*a*, 2260*b*, and 2260*c* are mounted on the circuit substrates 2240. The circuit substrates 2240 are connected to the display unit 2220 and the antennas 2260*a*, 2260*b*, and 2260*c* by cables or the like (not illustrated). The circuit substrates 2240 are located at positions facing the connection members 2400 when the display-side casing 2200 is located in the closed state.

The antennas 2260*a*, 2260*b*, and 2260*c* are communication units that perform wireless connection with the outside. The antenna 2260*a* is used for a wireless LAN and the antennas 2260*b* and 2260*c* are used for a wireless WAN. However, the embodiment of the present disclosure is not limited thereto, but the antennas 2260*a* to 2260*c* may have a wireless scheme of the same standard. The number of antennas is 3, but the embodiment of the present disclosure is not limited thereto. The number of antennas may be 2 or less.

In the embodiment, the antennas 2260*a*, 2260*b*, and 2260*c* are located at ends toward one end side (the rear surface side of the device) in the lateral direction with respect to the connection members 2400 when the display-side casing 2200 is in the closed state.

Therefore, it is possible to prevent an adverse influence of the connection members formed of a metal on antenna characteristics of the antennas 2260*a*, 2260*b*, and 2260*c*. When the display-side casing 2200 is in the opened state, the antennas 2260*a*, 2260*b*, and 2260*c* are distant from the connection members 2400. Therefore, there is no concern of the adverse influence on the antenna characteristics.

Here, the efficacy of the configuration of the display-side casing 2200 according to the embodiment will be described with reference to FIG. 38, in contrast with the configuration of the periphery of a display unit 2922 in the display-side casing 2920 according to a comparative example.

Figure 38:
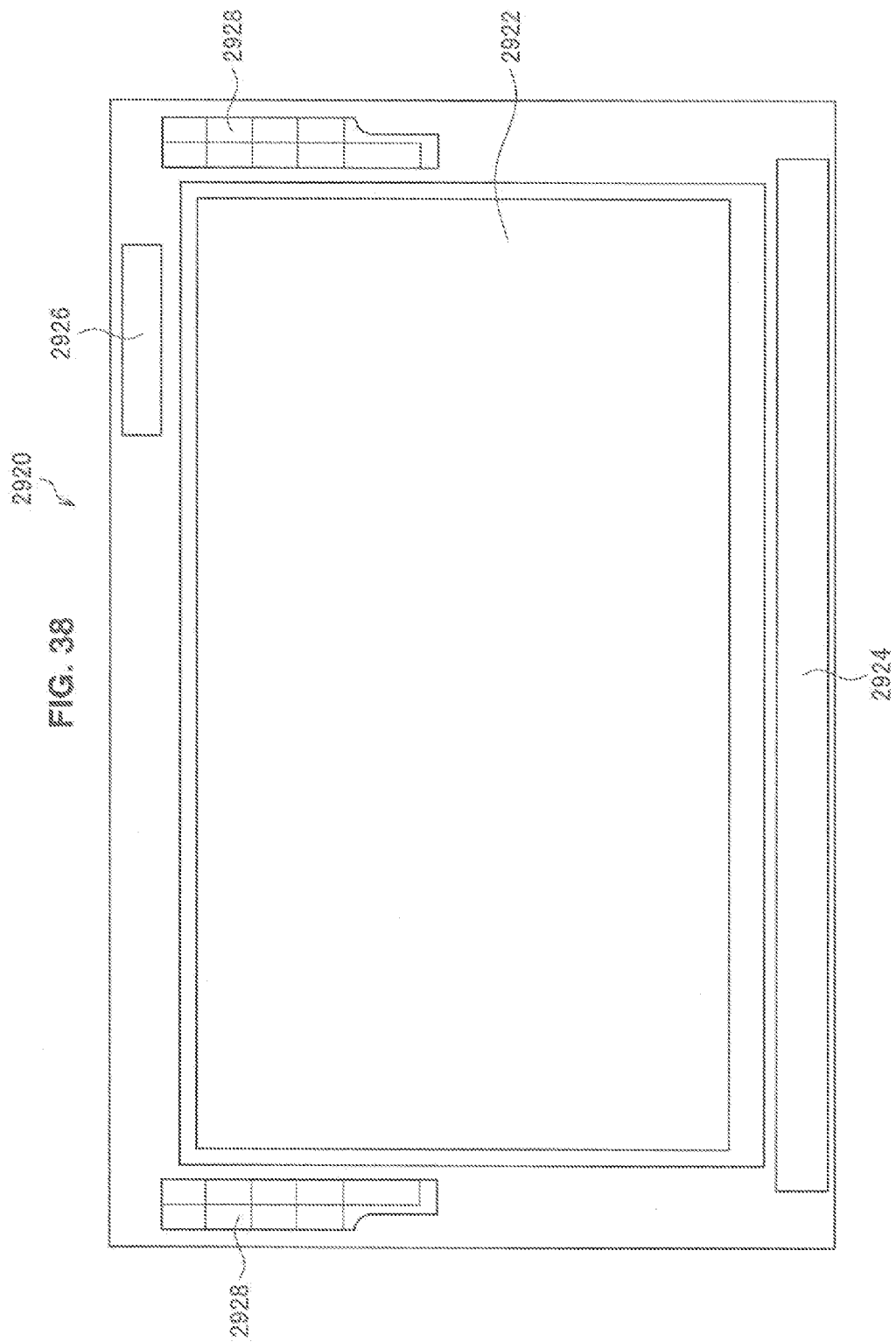
FIG. 38 is a schematic diagram illustrating an example of a display-side casing 2920 according to a comparative example.

FIG. 38 is a schematic diagram illustrating an example of the internal configuration of the display-side casing 2920 according to the comparative example. In the display-side casing 2920 according to the comparative example, concave reception portions 2928 in which the connection members are received are formed on both sides of the display unit 2922. Since the reception portions 2928 are disposed, a circuit substrate 2924 is disposed on one end side in the lateral direction rather than both sides in the longitudinal direction of the display unit 2922. Therefore, compared to the display-side casing 2200 illustrated in FIG. 37, an area occupied by the display unit 2922 in the display-side casing 2920 decreases. As a result, in order to enlarge the display unit 2922, it is necessary to increase the size of the display-side casing 2920. Further, since the reception portions 2928 are disposed, a position at which an antenna 2926 is disposed or the number of antennas 2926 is restricted.

In contrast, the reception concave portions 2350 as in the body-side casing 2300 are not formed in a surface that faces the body-side casing 2300 in the closed state of the display-side casing 2200 according to the embodiment, and this surface is smoothed. Therefore, in the embodiment, the circuit substrates 2240 can be disposed on both sides of the display unit 2220 in the display-side casing 2200, as illustrated in FIG. 37. As a result, it is possible to increase the size of the display unit 2220 without an increase in the size of the display-side casing 2200.

14. Conclusion

The above-described information processing device 2100 includes the connection members 2400 that slide the display-side casing 2200 with respect to the body-side casing 2300, as illustrated in FIG. 27. The body-side casing 2300 includes the reception concave portions 2350 which are formed in the concave shape in the manipulation surface 2310 and in which the connection members 2400 are received when the display-side casing 2200 overlaps the body-side casing 2300.

In this case, when the display-side casing 2200 is located in the closed state in which the display-side casing 2200 overlaps the body-side casing 2300, the connection members 2400 configured to include the arms and the like are received in the reception concave portions 2350. Thus, since it is not necessary to dispose the connection members 2400 on the outside of the body-side casing 2300 or the display-side casing 2200, it is possible to prevent the size of the information processing device 2100 from increasing. Since the body-side casing 2300 necessarily has a sufficient thickness to include the keyboard 2320 and the like and the reception concave portions 2350 are installed, there is no concern of the thickness of the body-side casing 2300 increasing. Therefore, the above-described connection members 2400 can be disposed even in the thinned information processing device 2100.

The preferred embodiments of the present disclosure have been described in detail above with reference to the appended drawings, but the technical scope of the present disclosure is not limited to the examples. It should be understood by those skilled in the art that various modifications, combinations, sub-combinations and alterations may occur depending on design requirements and other factors insofar as they are within the scope of the appended claims or the equivalents thereof.

The advantageous effects described in the present specification are merely descriptive and exemplary, and thus are not restrictive. That is, according to an embodiment of the technology related to the present disclosure, it is possible to obtain other advantageous effects apparent those skilled in the art along with the foregoing advantageous effects or instead of the foregoing advantageous effects from the description of the present specification.

Additionally, the present technology may also be configured as below.

(1)

An information processing device including:

a casing in which a top surface, a bottom surface, and side surfaces are integrally formed; and an opening portion which is formed in one of the top surface, the bottom surface, and the side surfaces and through which each component to be mounted inside the casing is inserted.

(2)

The information processing device according to (1), wherein the opening portion is formed in one of the side surfaces.

(3)

The information processing device according to (2), wherein the opening portion is formed by opening the one entire side surface.

(4)

The information processing device according to (2), wherein the one side surface is a surface in a longitudinal direction of the casing, and wherein the opening portion is formed by opening a central site of the one side surface in the longitudinal direction.

(5)

The information processing device according to any one of (1) to (4), wherein the opening portion is formed in the top surface.

(6)

The information processing device according to any one of (1) to (5), further including a connector installed on a side of the opening portion.

(7)

The information processing device according to any one of (1) to (6), wherein thicknesses of the side surfaces are thicker than a thickness of the top surface or the bottom surface.

(8)

The information processing device according to any one of (1) to (7), wherein the casing is formed of a fiber reinforced plastic.

(9)

The information processing device according to (8), wherein the casing is formed of a carbon fiber reinforced plastic.

(10)

The information processing device according to any one of (1) to (9), wherein the components include a keyboard and a substrate.

(11)

A method of manufacturing an information processing device, the method including:

preparing a casing in which a top surface, a bottom surface, and side surfaces are integrally formed;

inserting a component into the casing from an opening portion formed in one of the top surface, the bottom surface, and the side surfaces of the casing; and mounting the component inserted from the opening portion at a predetermined position inside the casing.

Additionally, the present technology may also be configured as below.

(1)

An information processing device including:

a first frame portion configured to include a plurality of opening portions formed to be partitioned by bars; and a second frame portion configured to be adjacent to the first frame portion in a first direction and formed in a continuous surface shape in a second direction substantially orthogonal to the first direction, wherein a component is disposed in at least one of the first and second frame portions.

(2)

The information processing device according to (1), wherein the second frame portion includes a wall portion erected from the continuous surface.

(3)

The information processing device according to (2), wherein the wall portion is formed to surround an end region of the second frame portion in the second direction.

(4)

The information processing device according to any one of (1) to (3), wherein a component with substantially the same size as an opening is disposed in the opening portion.

(5)

The information processing device according to (4), wherein a thickness of the first frame portion has the same size as a thickness of the component disposed in the opening portion.

(6)

The information processing device according to (2) or (3), wherein the second frame portion includes a concave portion in which the component is disposed.

(7)

The information processing device according to (6), wherein a position of a top face of the wall portion is the same as the position of a top face of the component disposed in the concave portion.

(8)

The information processing device according to any one of (1) to (7), further including a heat radiation member that is fitted in the second frame portion and radiates heat of a heating element to the second frame portion.

(9)

The information processing device according to (8), wherein the second frame portion has a concave portion in which the heat radiation member is fitted.

(10)

The information processing device according to any one of (1) to (9), further including a connector fitted in a substrate installed in the second frame portion, wherein one surface of a shell of the connector is exposed to the outside.

(11)

The information processing device according to (10), wherein the connector includes a joining portion of the shell on an opposite surface to the one surface of the shell exposed to the outside.

(12)

An information processing device including:

a first frame portion including a plurality of opening portions formed to be partitioned in a longitudinal direction by bars; and a second frame portion connected to the first frame, wherein, in the second frame portion, adjacent regions of the plurality of opening portions corresponding to widths of the plurality of opening portions in the longitudinal direction are formed in a continuous surface shape in the longitudinal direction, and wherein a component is disposed in at least one of the first and second frame portions.

(13)

The information processing device according to (12), wherein the second frame portion includes a wall portion erected from the continuous surface.

(14)

The information processing device according to (13), wherein the wall portion is formed to surround an end region of the second frame portion in the longitudinal direction.

(15)

The information processing device according to any one of (12) to (14), wherein a component with substantially the same size as an opening is disposed in the opening portion.

(16)

The information processing device according to (15), wherein a thickness of the first frame portion has the same size as a thickness of the component disposed in the opening portion.

(17)

The information processing device according to (13) or (14), wherein the second frame portion includes a concave portion in which the component is disposed.

(18)

The information processing device according to (17), wherein a position of a top face of the wall portion is the same as the position of a top face of the component disposed in the concave portion.

(19)

A frame structure of an information processing device including:

a first frame portion configured to include a plurality of opening portions formed to be partitioned by bars; and a second frame portion configured to be adjacent to the first frame portion in a first direction and formed in a continuous surface shape in a second direction substantially orthogonal to the first direction.

(20)

A frame structure of an information processing device including:

a first frame portion including a plurality of opening portions formed to be partitioned in a longitudinal direction by bars; and a second frame portion connected to the first frame, wherein, in the second frame portion, adjacent regions of the plurality of opening portions corresponding to widths of the plurality of opening portions in the longitudinal direction are formed in a continuous surface shape in the longitudinal direction.

Additionally, the present technology may also be configured as below.

(1)

An information processing device including:

a casing in which a top surface, a bottom surface, and side surfaces are integrally formed; and an opening portion which is formed in one of the top surface, the bottom surface, and the side surfaces and through which each component to be mounted inside the casing is inserted.

(2)

The information processing device according to (1), wherein the opening portion is formed in one of the side surfaces.

(3)

The information processing device according to (2), wherein the opening portion is formed by opening the one entire side surface.

(4)

The information processing device according to (2), wherein the one side surface is a surface in a longitudinal direction of the casing, and wherein the opening portion is formed by opening a central site of the one side surface in the longitudinal direction.

(5)

The information processing device according to any one of (1) to (4), wherein the opening portion is formed in the top surface.

(6)

The information processing device according to any one of (1) to (5), further including a connector installed on a side of the opening portion.

(7)

The information processing device according to any one of (1) to (6), wherein thicknesses of the side surfaces is thicker than a thickness of the top surface or the bottom surface.

(8)

The information processing device according to any one of (1) to (7), wherein the casing is formed of a fiber reinforced plastic.

(9)

The information processing device according to (8), wherein the casing is formed of a carbon fiber reinforced plastic.

(10)

The information processing device according to any one of (1) to (9), wherein the components includes a keyboard and a substrate.

(11)

A method of manufacturing an information processing device, the method including:

preparing a casing in which a top surface, a bottom surface, and side surfaces are integrally formed;

inserting a component into the casing from an opening portion formed in one of the top surface, the bottom surface, and the side surfaces of the casing; and mounting the component inserted from the opening portion at a predetermined position inside the casing.

(12)

The method of manufacturing the information processing device according to (11), wherein the component is inserted inside from the opening portion while being slid.

Additionally, the present technology may also be configured as below.

(1)

An information processing device including:

a first casing;

a second casing; and a connection portion connected to the first and second casings and configured to slide the second casing with respect to the first casing, wherein the first casing includes a reception concave portion which is formed in a concave shape in a surface facing the second casing and in which the connection member is received when the second casing is slid to overlap the first casing.

(2)

The information processing device according to (1), wherein the connection member is configured by a link mechanism including an arm.

(3)

The information processing device according to (2), wherein the connection member includes a plurality of the arms, and wherein the plurality of arms are received in the reception concave portion when the second casing is slid to overlap the first casing.

(4)

The information processing device according to any one of (1) to (3), wherein the connection member is installed on both ends in a longitudinal direction of the first casing and on one end side in a lateral direction.

(5)

The information processing device according to (4), wherein the first casing includes an input unit installed in an input region in a central site in the lateral direction, and wherein, when the second casing is slid to overlap the first casing, the connection member is located over the input region from one end side in the lateral direction.

(6)

The information processing device according to (4) or (5), wherein the first casing includes a connector installed in an end of the one end side in the lateral direction of the first casing, and wherein the connector is located toward one end side in the lateral direction with respect to the connection member.

(7)

The information processing device according to any one of (4) to (6), wherein the second casing includes a communication unit located at an end of the one end side in the lateral direction with respect to the connection member when the second casing is slid to overlap the first casing.

(8)

The information processing device according to any one of (1) to (7), wherein the second casing includes a display unit, and wherein the display unit is located on an opposite side to a side facing the first casing when the second casing is slid to overlap the first casing.

(9)

The information processing device according to any one of (1) to (8), wherein the second casing is slid between an opened state and a closed state with respect to the first casing, and wherein the second casing includes a holding member configured to be moved from a separate position at which the holding member is separated from the second casing to a contact position at which the holding member comes into contact with the second casing and hold the opened state of the second casing when the second casing is located in the opened state.

(10)

The information processing device according to (9), wherein the holding member is a magnet.

wherein a metal member is installed on the side with which the holding member of the second casing comes into contact, and wherein the magnet is adsorbed to the metal member by a magnetic force to be located at the contact position.

What is claimed is:

1. An information processing device comprising:

a casing in which a top surface, a bottom surface, and side surfaces are integrally formed; and an opening portion which is formed in at least one of the top surface, the bottom surface, and the side surfaces and which is configured to receive a plurality of components to be mounted inside the casing, wherein the plurality of components include a keyboard having a plurality of manipulation keys, and wherein the top surface is formed with a plurality of manipulation key holes, each manipulation key hole corresponding to one of the plurality of manipulation keys.

2. The information processing device according to claim 1, wherein the opening portion is formed in one of the side surfaces.

3. The information processing device according to claim 2, wherein the opening portion is formed by opening the one entire side surface.

4. The information processing device according to claim 2, wherein the one side surface is a surface in a longitudinal direction of the casing, and wherein the opening portion is formed by opening a central site of the one side surface in the longitudinal direction.

5. The information processing device according to claim 1, wherein the opening portion is formed in the top surface.

6. The information processing device according to claim 1, further comprising a connector installed on a side of the opening portion.

7. The information processing device according to claim 1, wherein thicknesses of the side surfaces are thicker than a thickness of the top surface or the bottom surface.

8. The information processing device according to claim 1, wherein the casing is formed of a fiber reinforced plastic.

9. The information processing device according to claim 8, wherein the casing is formed of a carbon fiber reinforced plastic.

10. The information processing device according to claim 1, wherein the plurality of components further include a substrate.

11. A method of manufacturing an information processing device, the method comprising:

preparing a casing in which a top surface, a bottom surface, and side surfaces are integrally formed;

inserting at least one component into the casing from an opening portion formed in at least one of the top surface, the bottom surface, and the side surfaces of the casing; and mounting the at least one component inserted from the opening portion at a predetermined position inside the casing, wherein the at least one component includes a keyboard having a plurality of manipulation keys, and wherein the top surface is formed with a plurality of manipulation key holes, each manipulation key hole corresponding to one of the plurality of manipulation keys, such that when the keyboard is inserted at the predetermined position inside the casing, the plurality of manipulation keys protrude from the plurality of manipulation key holes.

12. The method of manufacturing the information processing device according to claim 11, wherein the at least one component is inserted inside from the opening portion while being slid.

* * * * *